United States Patent
Sommerlade et al.

(10) Patent No.: US 12,481,530 B2
(45) Date of Patent: Nov. 25, 2025

(54) PERFORMING COMPUTING TASKS USING DECOUPLED MODELS FOR DIFFERENT DATA TYPES

(71) Applicant: Microsoft Technology Licensing, LLC, Redmond, WA (US)

(72) Inventors: Eric Chris Wolfgang Sommerlade, Oxford (GB); Mohsen Fayyaz, Berlin (DE); Nazuk Jain, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 545 days.

(21) Appl. No.: 18/072,735

(22) Filed: Dec. 1, 2022

(65) Prior Publication Data

US 2024/0184629 A1    Jun. 6, 2024

(51) Int. Cl.
*G06F 9/50* (2006.01)
(52) U.S. Cl.
CPC .................................. *G06F 9/5011* (2013.01)
(58) Field of Classification Search
None
See application file for complete search history.

(56) References Cited

U.S. PATENT DOCUMENTS

| | | | | |
|---|---|---|---|---|
| 11,734,242 B1* | 8/2023 | Bouyarmane | ........... | G06F 16/51 707/737 |
| 2002/0147694 A1* | 10/2002 | Dempsey | .............. | G06F 18/214 706/20 |
| 2002/0147754 A1* | 10/2002 | Dempsey | ................ | G06F 18/22 708/671 |
| 2018/0307745 A1* | 10/2018 | Bachrach | ............... | G06N 3/006 |
| 2019/0005374 A1* | 1/2019 | Shankar | ................ | G06N 3/084 |
| 2019/0197121 A1* | 6/2019 | Jeon | ........................ | G06F 40/56 |
| 2019/0318040 A1* | 10/2019 | Chaudhury | ............ | G06N 3/045 |
| 2019/0370616 A1* | 12/2019 | Eser | ....................... | G06F 18/256 |
| 2019/0371476 A1* | 12/2019 | Hernandez | ............. | G16H 50/50 |
| 2020/0074246 A1* | 3/2020 | Goyal | ..................... | G06N 3/088 |

(Continued)

OTHER PUBLICATIONS

Molino, et al., "Ludwig: a type-based declarative deep learning toolbox," arXiv, arXiv:1909.07930v1 [cs.LG], Sep. 17, 2019, 15 pages.

(Continued)

*Primary Examiner* — Adam Lee

(57) ABSTRACT

A technique executes tasks using a data store of machine-trained models. The data store specifically includes a subset of encoder-type machine-trained models for converting input data items having different input data types into respective embeddings in a vector space, and a subset of decoder-type machine-trained models for converting embeddings in the same vector space into data items having respective different output data types. When executing a particular task that involves one or more data types, the technique selects one or more machine-trained models that match those data types. In some implementations, the technique provides a clipboard store for storing embeddings produced by the encoder-type machine-trained models and consumable by the decoder-type machine-trained models. The technique includes provisions for ensuring that any decoder-type machine-model is capable of processing embeddings produced by different versions of the encoder-type machine-trained models.

20 Claims, 11 Drawing Sheets

(56) References Cited

U.S. PATENT DOCUMENTS

| | | | |
|---|---|---|---|
| 2020/0082807 A1* | 3/2020 | Kim | G10L 13/047 |
| 2020/0184316 A1* | 6/2020 | Kavukcuoglu | H03M 7/3082 |
| 2020/0234725 A1* | 7/2020 | Garbacea | G10L 19/16 |
| 2020/0311542 A1* | 10/2020 | Wang | G06N 5/02 |
| 2020/0327963 A1* | 10/2020 | Ui | G16H 50/70 |
| 2020/0342643 A1* | 10/2020 | Gouws | G06T 11/60 |
| 2020/0372621 A1* | 11/2020 | Naruniec | G06N 3/04 |
| 2020/0394998 A1* | 12/2020 | Kim | G10L 13/10 |
| 2021/0056980 A1* | 2/2021 | Gfeller | G10L 25/51 |
| 2021/0081673 A1* | 3/2021 | Lai | G06V 20/41 |
| 2021/0109966 A1* | 4/2021 | Ayush | G06N 3/044 |
| 2021/0133539 A1* | 5/2021 | Srivastava | G06N 3/047 |
| 2021/0142783 A1* | 5/2021 | Kim | G10L 13/033 |
| 2021/0287138 A1* | 9/2021 | Chang | G06F 30/13 |
| 2021/0326751 A1* | 10/2021 | Liu | G06N 3/084 |
| 2021/0390400 A1* | 12/2021 | Yao | G06N 3/045 |
| 2021/0394784 A1* | 12/2021 | Blaiotta | G06N 3/0455 |
| 2022/0067408 A1* | 3/2022 | Sheu | G06T 11/20 |
| 2022/0198715 A1* | 6/2022 | Wilczynski | H04N 19/17 |
| 2022/0207362 A1* | 6/2022 | Meyerson | G06N 3/045 |
| 2022/0230625 A1* | 7/2022 | Zhu | G10L 15/063 |
| 2022/0237389 A1* | 7/2022 | Dognin | G06N 5/025 |
| 2022/0262002 A1* | 8/2022 | Wang | G06V 10/454 |
| 2022/0284551 A1* | 9/2022 | Neofytou | G06N 3/08 |
| 2022/0319500 A1* | 10/2022 | Lee | G10L 15/063 |
| 2022/0351041 A1* | 11/2022 | Lee | G06F 9/5044 |
| 2022/0368356 A1* | 11/2022 | Luo | H03M 13/37 |
| 2022/0414429 A1* | 12/2022 | Torrado | G06N 3/0455 |
| 2023/0019211 A1* | 1/2023 | Wang | G06N 3/0464 |
| 2023/0082079 A1* | 3/2023 | Douillard | G06N 3/006 382/155 |
| 2023/0153611 A1* | 5/2023 | Mathur | G06F 18/214 706/15 |
| 2023/0162758 A1* | 5/2023 | Borgstrom | G10L 25/24 704/200 |
| 2023/0204721 A1* | 6/2023 | Meyer | G01S 7/417 342/195 |
| 2023/0206898 A1* | 6/2023 | Stanton | G10L 13/027 704/260 |
| 2023/0252268 A1* | 8/2023 | Giovannini | G06N 3/088 706/21 |
| 2024/0020048 A1* | 1/2024 | Bert | G06F 7/5443 |
| 2024/0104719 A1* | 3/2024 | Gulsun | G16H 50/20 |
| 2024/0135683 A1* | 4/2024 | Li | G06V 20/70 |
| 2024/0152749 A1* | 5/2024 | Shanahan | G06N 3/045 |

OTHER PUBLICATIONS

Molino, et al., "COTA: Improving the Speed and Accuracy of Customer Support through Ranking and Deep Networks," arXiv, arXiv:1807.01337v1 [cs.LG], Jul. 3, 2018, 9 pages.

Lendave, Vijaysinh, "LUDWIG: a Type-Based Declarative Deep Learning Toolbox," available at https://web.archive.org/web/20211229132112/https://analyticsindiamag.com/ludwig-a-type-based-declarative-deep-learning-toolbox/, Developer's Corner, WayBack Machine version captured on Dec. 29, 2021, 15 pages.

PCT Search Report and Written Report in PCT/US2023/035554, mailing date Feb. 12, 2024, 15 pages.

Xu, et al., "AttnGAN: Fine-Grained Text to Image Generation with Attentional Generative Adversarial Networks," arXiv, Cornell University, arXiv:1711.10485v1 [cs.CV], Nov. 28, 2017, 9 pages.

Agnese, et al., "A Survey and Taxonomy of AdversarialNeural Networks for Text-to-Image Synthesis," arXiv, Cornell University, arXiv:1910.09399v1 [cs.CV], Oct. 21, 2019, 26 pages.

Dosovitskiy, et al., "An Image is Worth 16×16 Words: Transformers for Image Recognition at Scale," arXiv, Cornell University, arXiv:2010.11929v2cs.CV], Jun. 3, 2021, 22 pages.

Ramesh, et al., "Zero-Shot Text-to-Image Generation," arXiv, Cornell University, arXiv:2102.12092v2 [cs.CV], Feb. 26, 2021, 20 pages.

Radford, et al., "Learning Transferable Visual Models From Natural Language Supervision," arXiv, Cornell University, arXiv:2103.00020v1 [cs.CV], Feb. 26, 2021 48 pages.

Nichol, et al., "GLIDE: Towards Photorealistic Image Generation and Editing with Text-Guided Diffusion Models," arXiv, Cornell University, arXiv:2112.10741v3 [cs.CV], Mar. 8, 2022, 20 pages.

Rombach, et al., "High-Resolution Image Synthesis with Latent Diffusion Models," arXiv, Cornell University, arXiv:2112.10752v2 [cs.CV], Apr. 13, 2022, 45 pages.

Ramesh, et al., "Hierarchical Text-Conditional Image Generation with CLIP Latents," arXiv, Cornell University, arXiv:2204.06125v1 [cs.CV], Apr. 13, 2022, 27 pages.

Luo, Calvin, "Understanding Diffusion Models: a Unified Perspective," arXiv, Cornell University, arXiv:2208.11970v1 [cs.LG], Aug. 25, 2022, 23 pages.

Saharia, et al., "Photorealistic Text-to-Image Diffusion Models with Deep Language Understanding," arXiv, Cornell University, arXiv:2205.11487v1 [cs.CV], May 23, 2022, 46 pages.

O'Connor, Ryan, "How Imagen Actually Works," available at https://www.assemblyai.com/blog/how-imagen-actually-works/, Assembly AI, Jun. 23, 2022, 19 pages.

Devlin, et al., "BERT: Pre-training of Deep Bidirectional Transformers for Language Understanding," arXiv, Cornell University, arXiv:1810.04805v2 [cs.CL], May 24, 2019, 16 pages.

Vaswani, et al., "Attention Is All You Need," arXiv, Cornell University, arXiv:1706.03762v5 [cs.CL], Dec. 6, 2017 15 pages.

Brown, et al., "Language Models are Few-Shot Learners," arXiv, Cornell University, arXiv:2005.14165v4 [cs.CL], Jul. 22, 2020, 75 pages.

Royal Skies, "Stable Diffusion Seeds: (EXPLAINED !!)," available at https://www.youtube.com/watch?v=bu2E122YYmo, printout of a YouTube page, playback time 0:00, accessed on Nov. 30, 2022, 1 page.

Redmond, et al., "You Only Look Once: Unified, Real-Time Object Detection," arXiv, Cornell University, arXiv:1506.02640v5 [cs.CV], May 9, 2016, 10 pages.

He, et al., "Deep Residual Learning for Image Recognition," arXiv, Cornell University, arXiv:1512.03385v1 [cs.CV], Dec. 10, 2015, 12 pages.

International Preliminary Report on Patentability for PCT Application No. PCT/US23/035554, mailed on Jun. 12, 2025, 9 pages.

\* cited by examiner

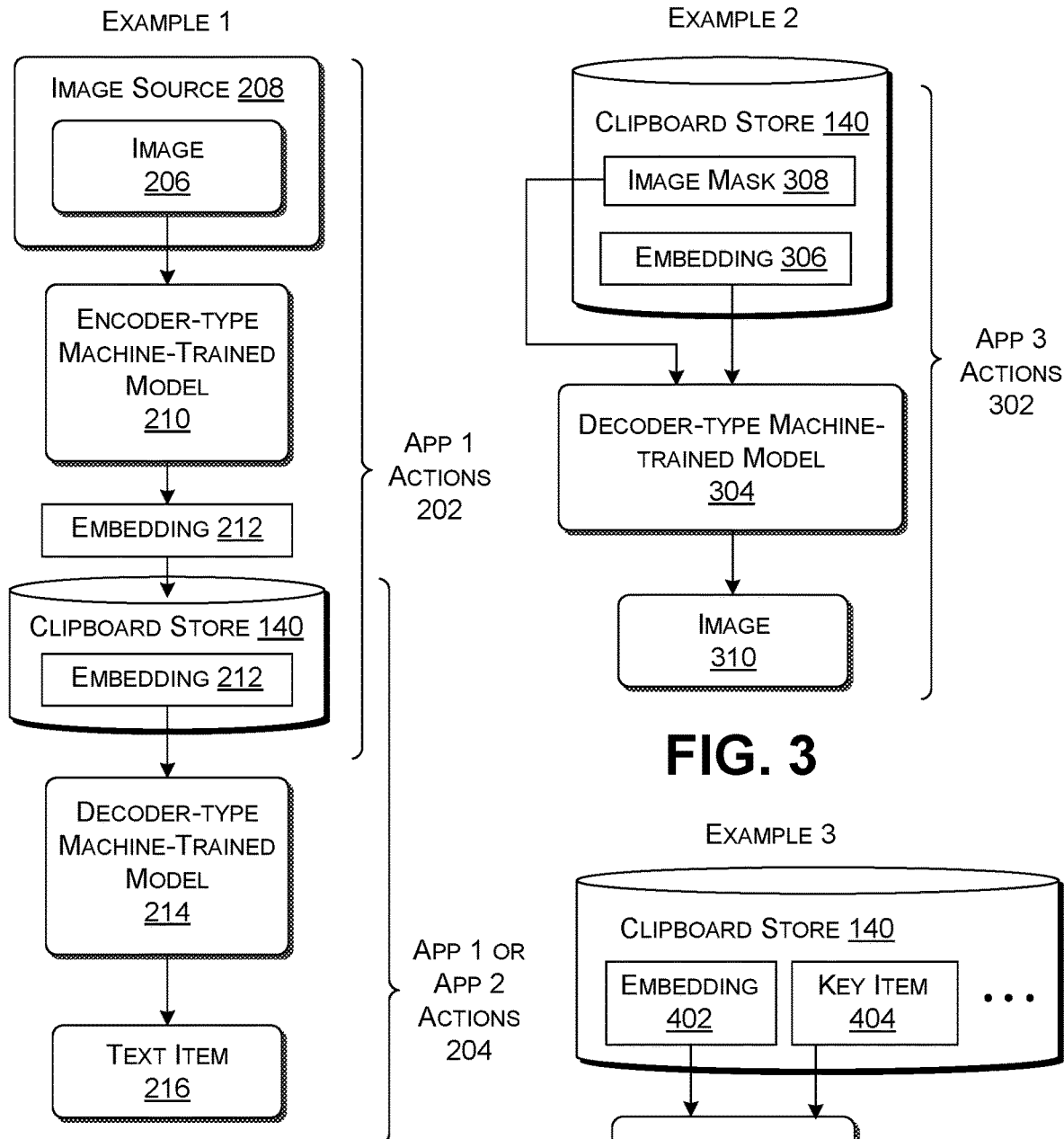
FIG. 2
FIG. 3
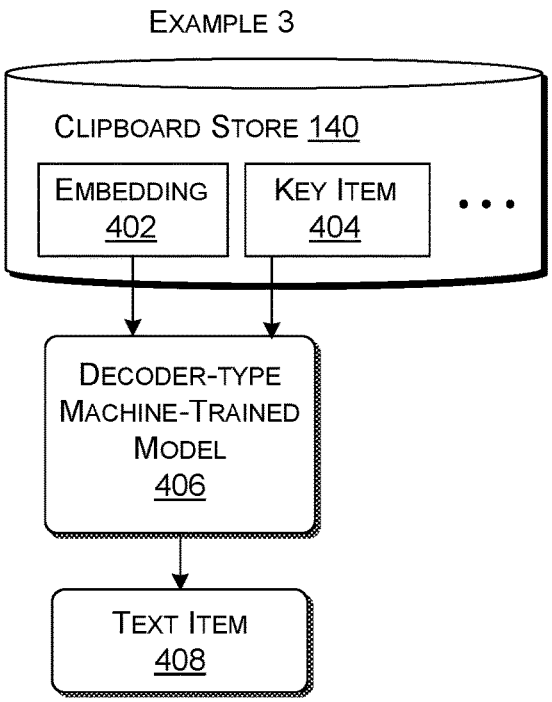
FIG. 4

| Requesting Entity | What Does it Want to do? | Target Entity |
|---|---|---|
| App 1 | Incorporate output data item in an application workspace based on an embedding in the clipboard store. | App 1 |
| App 1 | Store an embedding associated with an input data item in the clipboard store. | Clip-board |
| ⋮ | ⋮ | ⋮ |

OVERVIEW OF OPERATION OF THE COMPUTING SYSTEM, 1702

SELECT A PARTICULAR MACHINE-TRAINED MODEL THAT HAS A DATA TYPE ASSOCIATED WITH A REQUESTED TASK, THE SELECTING INVOLVING CHOOSING THE PARTICULAR MACHINE-TRAINED MODEL FROM A SET OF MACHINE-TRAINED MODELS, THE SET OF MACHINE-TRAINED MODELS INCLUDING A SUBSET OF ENCODER-TYPE MACHINE-TRAINED MODELS THAT MAP INPUT ITEMS HAVING DIFFERENT INPUT DATA TYPES TO RESPECTIVE FIRST EMBEDDINGS, AND A SUBSET OF DECODER-TYPE MACHINE-TRAINED MODELS THAT MAP SECOND EMBEDDINGS TO RESPECTIVE OUTPUT ITEMS HAVING DIFFERENT OUTPUT DATA TYPES.
1704

EXECUTE THE PARTICULAR MACHINE-TRAINED MODEL TO PERFORM AT LEAST PART OF THE REQUESTED TASK.
1706

FIG. 17

PERFORMING COMPUTING TASKS USING DECOUPLED MODELS FOR DIFFERENT DATA TYPES

BACKGROUND

The computing industry offers an increasingly diverse collection of machine-trained models that perform different end-to-end tasks. For example, an image captioning machine-trained model maps an image into a text caption for the image. While these types of machine-trained models exhibit satisfactory performance in some cases, the execution and maintenance of these models requires a significant amount of computing resources.

SUMMARY

A technique is described herein for executing tasks using a data store of machine-trained models. The data store specifically includes a subset of encoder-type machine-trained models for converting input data items having different input data types into respective embeddings in an embedding space (e.g., a vector space), and a subset of decoder-type machine-trained models for converting embeddings in the same embedding space into data items having respective different output data types. When executing a particular task that involves one or more data types, the technique selects one or more machine-trained models from the set that match those data types. The shared embedding space will henceforth be referred to below as a vector space.

The subset of encoder-type machine-trained models are said to be decoupled from the subset of decoder-type machine-trained models because the technique combines machine-trained models together in a dynamic manner depending on the requirements of the particular task. In contrast to traditional approaches that rely on end-to-end machine-trained solutions, in the technique disclosed herein, no encoder-type machine-trained model has a fixed association with any decoder-type machine-trained model.

In one example, assume that a user makes a request in the course of interacting with an image-editing application to copy an image, and then later interacts with a word processing application to paste a textual description of the image into a document being created. The technique operates by: (1) selecting an encoder-type machine-trained model for processing an image data type; (2) using the encoder-type machine-trained model to convert the image into an embedding; (4) selecting a decoder-type machine-trained model that produces text content; (5) using the decoder-type machine-trained model to convert the embedding into a text item; and (6) pasting the text item into the document being created. Overall, the technique can be said to decouple a single end-to-end task (here, converting an image into text) into two more fundamental machine-trained operations performed by separate machine-trained models, selected from a larger set of such models.

In some implementations, a control system, such as an operating system of a computing system, coordinates interaction by applications with the machine-trained models.

In some implementations, the technique provides a clipboard store for storing embeddings produced by the encoder-type machine-trained models, and consumable by the decoder-type machine-trained models.

In some implementations, the technique accommodates the introduction of new encoder-type and decoder-type machine-trained models, with the constraint that the new models are expected to have been trained to produce or consume embeddings with respect to the same vector space as the existing models. This technique is scalable in this regard.

In some implementations, an embedding produced by an updated version of an encoder-type machine-trained model for a particular input data item may include a base part and a supplemental part. All decoder-type machine-trained models are capable of interpreting at least the base part of the embedding, while later versions of decoder-type machine-trained models are capable of interpreting both parts of the embedding.

The technique is advantageous because its decoupled model architecture reduces the number of machine-trained models that a computing system must store and maintain to perform different tasks, compared to a traditional solution that stores a separate machine-trained model for performing each complete end-to-end task. This allows the computing system to reduce the amount of computing resources that are required to perform a diverse range of operations, compared to the traditional solution. The technique also facilitates the updating, versioning, and deployment of the machine-trained models. The technique also improves consistency in the behavior and quality of applications that rely on machine-trained models. The technique also empowers users to combine machine-trained models in diverse and flexible ways, compared to a traditional solution that relies on application-specific end-to-end machine-trained solutions.

The above-summarized technology is described herein as manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 shows a first example of the use of the computing system of FIG. 1.

FIG. 3 shows a second example of the use of the computing system of FIG. 1.

FIG. 4 shows a third example of the computing system in which a clipboard store stores both an embedding and a supplemental item (e.g., an instance of noise information) for a particular input data item.

FIG. 17 shows a process that describes one manner of operation of the computing system of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computing system that dynamically selects from a set of machine-trained models. Section B sets forth illustrative methods that explain the operation of the computing system of Section A. Section C describes illustrative computing functionality that, in some implementations, is used to implement any aspect of the features described in Sections A and B.

A. Illustrative Computing System

Figure 1:
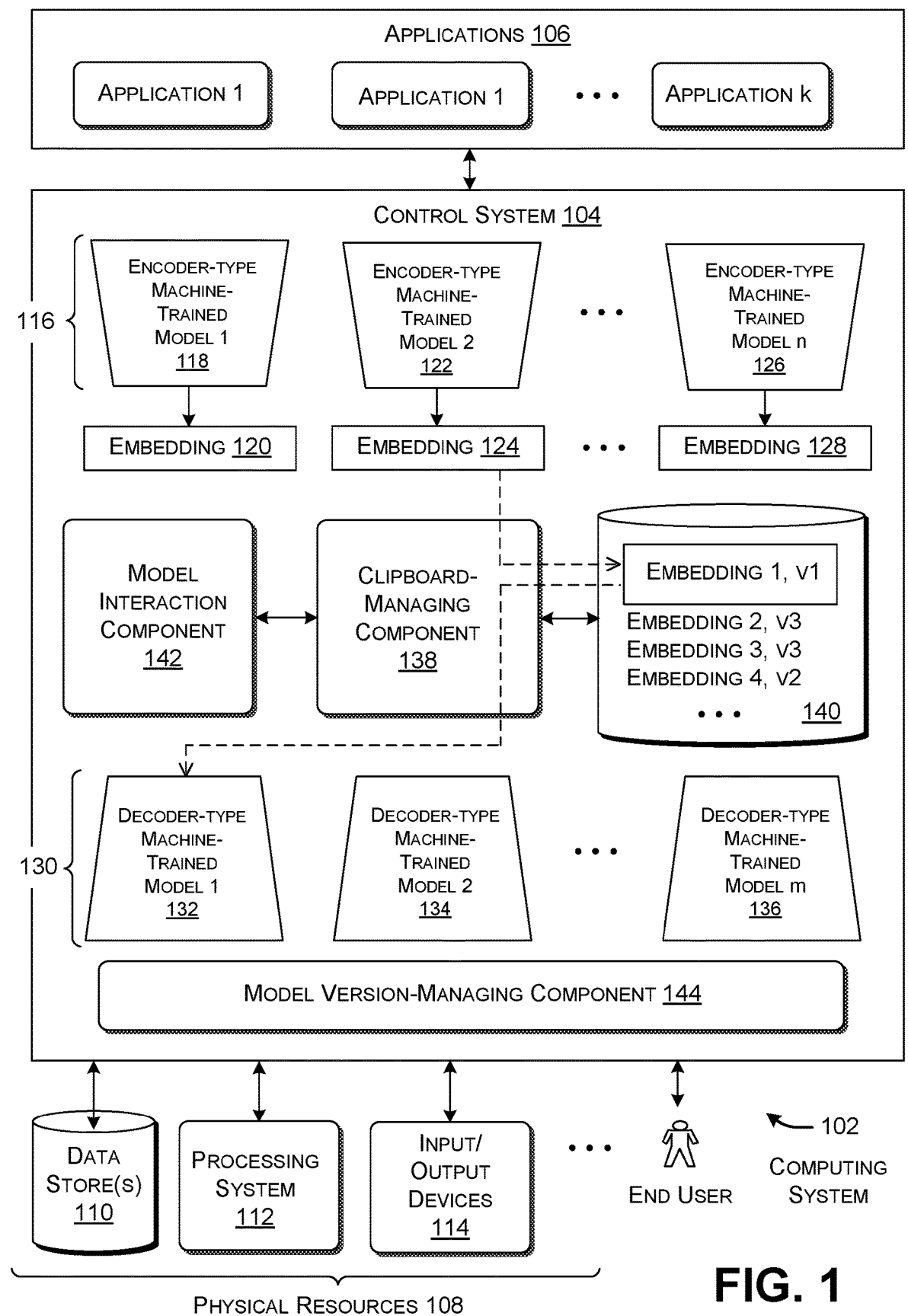
FIG. 1 shows a computing system having a set of machine-trained models for handling different respective data types.

FIG. 1 shows a computing system 102 for performing tasks using a set of machine-trained models. In some examples, the computing system 102 corresponds to a local computing device of any type, including any of a desktop computing device, a handheld computing device of any type (e.g., a smartphone), a game console device, etc. In other cases, the computing system 102 is implemented by one or more servers accessible via a computer network. A user interacts with the server(s) via a local computing device of any type, e.g., via a browser application running on the local computing device. In other cases, the computing system 102 is implemented by computing resources distributed between local and remote computing devices. Most of the examples presented below, however, are framed in the representative context in which the computing system 102 is implemented by a local computing device with which a user interacts.

The computing system 102 includes a control system 104 that that provides a set of services that allow a set of applications 106 to interact with physical resources 108. In the examples that follow, it is most often assumed that the control system 104 is the operating system of the computing system 102. However, the control system 104 encompasses any logic that enables applications to interact with the physical resources 108 of the computing system 102, regardless of whether this logic is referred to by the manufacturer as an "operating system." For example, the control system 104 encompasses hardware-implemented control logic provided by a handheld computing device that is not explicitly identified by the manufacturer of the device as an "operating system."

The applications 106 include any type(s) of computer programs for performing any functions. In some implementations, the applications 106 are implemented by the same local computing device that implements the computing system 102. In other implementations, the applications 106 are implemented by one or more servers. In other cases, the applications 106 are implemented by computing resources that are distributed between local and remote computing devices. To name just a few representation functions, a first application provides a word processing program, a second application provides an image editing program, a third application provides a communication (e.g., an Email) program, and so on.

Some of the physical resources 108 correspond to internal components of the computing system 102 itself. These types of physical resources 108 include one more data sores 110 and a processing system 112. The data stores 110 include devices for implementing transitory memory (e.g., RAM), archival storage (e.g., disk storage), etc. Other components of the physical resources 108 correspond to devices that interact with the computing system 102, but are not part of the computing system 102 itself. These resources include various types of input devices and output devices 114, including camera devices, video cameras, 3D object-scanning devices (e.g., the KINECT device provided by MICROSOFT CORPORATION of Redmond, Washington), display devices, printers, speakers, etc. Additional information regarding one implementation of the computing system 102 appears below in Section C.

The set of machine-trained models includes a first subset 116 of encoder-type machine-trained models that map input data items expressed using different input data types into respective embeddings. FIG. 1 specifically shows that the first subset 116 includes an encoder-type machine-trained model 118 for mapping an input data item having a first input data type to a particular embedding 120, an encoder-type machine-trained model 122 for mapping an input data item having a second input data type to a particular embedding 124, an encoder-type machine-trained model 126 for mapping an input data item having a third input data type to a particular embedding 128, and so on. Insofar as the first subset 116 of encoder-type machine-trained models perform an encoding function, they may be regarded as encoders, and are symbolically illustrated in FIG. 1 as such.

The set of machined-trained models includes a second subset 130 of decoder-type machine-trained models that map embeddings into output data items expressed using different output data types. FIG. 1 specifically shows that the second subset 130 includes a decoder-type machine-trained model 132 for mapping an embedding to an output data item having first output data type, a second decoder-type machine-trained model 134 for mapping an embedding to an output data item having second output data type, and a third decoder-type machine-trained model 136 for mapping an embedding to an output data item having a third output data type. Insofar as the second subset 130 of decoder-type machine-trained models perform a decoding function, they may be regarded as decoders, and are symbolically illustrated in FIG. 1 as such.

Examples of different types of input data types include a text-based input data type, an image-based input data type, a video input data type, an audio-based input data type, etc. Examples of different output data types include some of the same data types mentioned above, although it is also possible for an output data type to have no counterpart input data type, and vice versa. For example, one encoder-type machine-trained model operates on a data item having a 3D object-scanning input type, but there is no decoder-type machine-trained model that produces a data item having that particular data type. A "data item," as the term is used herein, includes a unit of content, including an image or part thereof, a document or part thereof, an audio file or part thereof, and so on.

Each machine-trained model incorporates any model architecture or combination of model architectures, and performs any function or combination of functions. Examples of functions include a classification function, a regression function, a generative function, and so on.

In many cases, each data item constitutes an item that a user may visualize, and/or store, and/or manipulate. Images and documents are examples of this kind of data item. In other cases, an input item is not necessarily directly consumable by a user. For example, an output data item may correspond to information produced by a machine-trained model that is consumed by the same machine-trained model or another machine-trained model. In one such example, a decoder-type machine-trained model maps an input embedding to an output embedding that is consumable by another machine-trained model. In another example, a decoder-type machine-trained model produced by reinforcement learning provides some type of output information that is specific to this kind of model, such as value information or reward information.

An embedding is a data item that represents the semantic content expressed in a data item in a distributed-representation vector or other data structure that represents information in distributed form. A distributed-representation vector differs from a one-hot vector. Each dimension of a one-hot vector is assigned a particular semantic concept. As such, a one-hot vector has a dimensionality as large as the vocabulary it represents. A distributed-representation vector, by contrast, is a vector that expresses semantic content via information that is distributed over the dimensions of the vector, with no individual dimension having a fixed association with any semantic concept. A distributed-representation vector typically has a much smaller dimensionality than a one-hot vector.

The set of machine-trained models used by the control system 104 all interact with embeddings in the same vector space. This means that the embeddings produced by the first subset 116 of encoder-type machine-trained models produce embeddings in the singular vector space. Likewise, the embeddings consumed by the second subset 130 of decoder-type machine-trained models consume embeddings in the same singular vector space. The vector space has as many dimensions as the size of the embeddings.

As will be described in greater detail below, a training system (not shown in FIG. 1) trains an initial encoder-type machine-trained model to produce embeddings in such a manner that embeddings for similar semantic concepts are placed relatively close together in the vector space, and embeddings for dissimilar semantic concepts are placed relatively far apart in the vector space. The training system assesses the degree of a similarity of any two embeddings using any distance metric, such as cosine similarity. Additional encoder-type machine-trained models are trained to correctly produce embeddings (e.g., vectors) in the same vector space established by the first machine-trained model. The training system trains each decoder-type machine-trained model to correctly convert embeddings in the shared vector space into data items.

In some cases, the set of machine-trained models includes two or more encoder-type machine-trained models that map data items of the same input data type (e.g., the image data type) into embeddings. For example, different developers or manufacturers may provide the two or more encoder-type machine-trained models. In some cases, the two or more encoder-type machine-trained models use different algorithms, have different sets of features, offer different user experiences, etc. In some cases, a user makes a preference setting via the control system 104 that selects one of these encoder-type machine-trained models as a default model to be used when the conversion function it performs is invoked. Similarly, in some cases, the set of machine-trained models includes two or more decoder-type machine-trained models that map embeddings to data items of the same output data type, any of which can be chosen by the user as the default decoder-type machine-trained model to be used when the conversion function it performs is invoked.

Further note that, in some cases, a model provider provides an updated version of a preexisting machine-trained model. In some cases, the updated version uses a more efficient or accurate algorithm to perform its function relative to a previous version of the machine-trained model, or incorporates additional features not present in the previous version. The model provider ensures that any new version of a previous version of an encoder-type machine-trained model produces embeddings that match the previous embeddings produced by the previous versions of the encoder-type machine-trained model for the same data items. However, as will be described in greater detail below, an updated version of an encoder-type machine-trained model is capable of producing an embedding having a supplemental part that that is not present in previous embeddings.

Similarly, a model provider ensures that any new version of a decoder-type machine-trained model is capable of consuming embeddings in the existing shared vector space, regardless of the type of encoder-type machine-trained model that produces the embeddings, and the version thereof. In some cases, a decoder-type machine-trained model will process a base part of an embedding produced by an updated version of an encoder-type machine-trained model, but ignore a supplemental part of the embedding produced by the encoder-type machine-trained model. In other cases, an updated version of the decoder-type machine-trained model includes logic that complements the updated version of an encoder-type machine-trained model, and will successfully process the supplemental part of an embedding produced by the updated version of the encoder-type machine-trained model.

The control system 104 also includes a clipboard-managing component 138 for storing and retrieving data items from a clipboard store 140. The clipboard-managing component 138 is capable of performing any functions that a traditional clipboard-managing component 138 performs, including storing image items, text items, etc. The clipboard-managing component 138 is extended in the computing system 102 to store and retrieve embeddings in the clipboard store 140 in various circumstances described below.

A model iteration component 142, also implemented by the control system 104, coordinates all interaction with the machine-trained models. For instance, FIG. 1 shows the merely representative case in which the user issues an instruction to store a data item having a particular input data type in the clipboard store 140. In response, the model interaction component 142: (1) determines that the input data type matches the encoder-type machine-trained model 122; (2) invokes the encoder-type machine-trained model 122 to map the input data item to a particular embedding 124; and (3) instructs the clipboard-managing component 138 to store the particular embedding 124 in the clipboard store 140. Alternatively, the model interaction component 142 instructs the clipboard-managing component 138 to store the original input data item in the clipboard store 140 without converting it yet to the embedding 124. In this implementation, the control system 104 will only convert the input data item to the embedding 124 if the user later instructs the control system 104 to perform a pasting function that requires converting the input data item into a different data type than the input data type. Alternatively, the model interaction component 142 instructs the clipboard-managing component 138 to immediately store both the embedding 124 and the original input data item in the clipboard store 140. Still other process flows are possible.

Next assume that the user instructs the same application or a different application to paste the original data item that has been processed in the manner described above into an application workspace using a data type that differs from the original input data type. First assume that the clipboard store 140 already stores the embedding 124 produced by the encoder-type machine-trained model 122. Here, the model interaction component 142: (1) determines that the requested output data type corresponds to a decoder-type machine-trained model 132; (2) invokes the decoder-type machine-trained model 132 to map the embedding 124 to an output data item in the appropriate data type; and (3) pastes the data item into the application workspace.

Alternatively assume that the clipboard store 140 stores the original data item and not its embedding 124. Here, the model interaction component 142 performs the preliminary operation of: (1) selecting the encoder-type machine-trained model 122; (2) using the encoder-type machine-trained model 122 to convert the data item to the particular embedding 124; and (3) optionally instructing the clipboard-managing component 138 to temporarily store the embedding 124 in the clipboard store 140. Operation (3) has the merit of making the embedding 124 available for later use in another conversion operation, without requiring the encoder-type machine-trained model 122 to generate the embedding 124 again.

Overall, the machine-trained models provided by the control system 104 represent decoupled mapping resources in the sense that they are decoupled from potentially more comprehensive end-to-end conversion tasks. When performing such an end-to-end task, the model interaction component 142 assembles the mapping resources that are necessary to perform that task. This capability results in a more efficient implementation of computing tasks. For instance, consider the merely illustrative case in which there are N possible input data types and M possible output data types. A computing system that is configured to include end-to-end models for converting between every possible pairing of these data types will need to include N*M machine-trained models. In the present case, the control system 104 need only store N+M machine-trained models because any of the first subset 116 of encoder-type machine-trained models is combinable with any of the second subset 130 of decoder-type machine-trained models. A computing system that adopts the architecture shown in FIG. 1 therefore uses less storage resources to store its machine-trained models compared to the above-described alternative case (in which the computing system uses N*M models).

A computing system that adopts the architecture shown in FIG. 1 also simplifies the maintenance of its machine-trained models compared to the alternative case because there are fewer machine-trained models to service. Due to its flexible reuse of machine-trained models, a computing system that adopts the architecture shown in FIG. 1 also offers a consistent set of functionality and consistent data conversion performance, and, for this reason, improves the consistency of the user experience offered to users. Further still, a computing system that adopts the architecture shown in FIG. 1 offers diverse options for combining different machine-trained models when interacting with applications, and for storing the intermediate output results of decoupled encoder-type machine-trained models in the clipboard store 140. Such a computing system is therefore more flexible than traditional systems that offer fixed end-to-end machine-trained solutions. Still further merits of the computing system 102 are set forth below.

A model version-managing component 144 ("version-managing component" for brevity) manages the introduction of new machine-trained models, either for existing data types or new data types that are not yet represented by the set of existing machine-trained models. As one function, the version-managing component 144 performs a gatekeeping registration function. For example, the version-managing component 144 component performs a test to ensure that any newly introduced encoder-type machine-trained model will correctly map semantic content expressed in input data types to the existing vector space. Likewise, the version-managing component 144 performs a test to ensure that any newly introduced decoder-type machine-trained model will correctly convert vectors in the existing vector space into respective data items. Additional information regarding a training system that ensures conformity of new machine-trained models to the above constraints will be set forth below in the context of the explanation of FIG. 13.

In other implementations, at least part of the version-managing component 144 is implemented by a model marketplace service (not shown) provided by one or more servers. The model marketplace service ensures that the models it offers to local computing systems (implemented by respective local user devices) all produce and consume embeddings in the shared vector space. In some implementations, the model marketplace service also ensures that its models meet various quality and security metrics.

Note that the computing system 102 is described above for the illustrative case in which each encoder-type machine-trained model maps a single data item into a single embedding, and each decoder machine-trained model maps a single embedding into a single output data item. In other cases, at least one encoder-type machine-trained model maps two or more data items into a single embedding. Alternatively, or in addition, at least one decoder-type machine-trained model maps two or more input data items into a single output data item. In some cases, for the case of a decoder-machine-trained model, the two or more input data items include two or more embeddings. Alternatively, or in addition, the two or more input data items include at least one embedding and another type of data item (such as a mask item). FIG. 3, explained below, will present an example of this type of decoder-type machine-trained model.

FIG. 2 shows a first example of the computing system 102 in which a first application performs a first set of actions 202, and a second application (or the first application) performs a second set of actions 204. Consider the case in which the first set of actions 202 and the second set of actions 204 are performed by the first application and the second application, respectively. With respect to the first set of actions 202, the application receives an image 206 from an image source 208, such as an image-capturing device (e.g., a camera) or a storage device that stores a previously-captured image. An encoder-type machine-trained model 210 maps the image 206 to an embedding 212. FIG. 1 shows that the clipboard-managing component 138 stores the embedding 212 in the clipboard store 140, but as will be described below, this is only one possible scenario. In the second set of actions 204, the second application retrieves the embedding 212 from the clipboard store 140. The second application then uses a decoder-type machine-trained model 214 to map the embedding 212 to a text item 216. Assume that the second application then pastes the text item 216 into a text document.

In one scenario, the user may perform the first set of actions 202 in the course of interacting with an image-editing application, e.g., by selecting a portion of a larger image that the user is currently viewing. Assume that the image 206 corresponds to the selected portion. Assume that the user next invokes a word processing program to paste text that represents the semantic context of the image 206 into a text document. In an alternative scenario, assume that the user first invokes the word processing program. The word processing program performs both the first and second sets of actions (202, 204). For example, assume that the user issues an instruction while working with the word processing program to paste an image retrieved from a file into a text document.

In still another example, assume that the first set of actions 202 stores the image 206 in the clipboard store 212, without immediately converting the image 206 into the embedding 212. Here, the computing system 102 only converts the image 206 to the embedding 212 once the user issues an instruction to paste the image 206 into a target item (here, a text document) having a different data type than an image data type.

FIG. 3 shows a second example of the use of the computing system 102. Here, assume that an application performs a set of actions 302 that cause a decoder-type machine-trained model 304 to receive two or more input data items from the clipboard store 140, including an embedding 306 and an image mask 308. The encoder-type machine-trained model 304 maps these input data items into an image 310. For example, assume that the embedding 306 represents plural objects that appear in a scene and the mask 308 represents one of those objects. Depending on how it has been trained, the decoder-type machine-trained model 304 produces an image 310 that includes only the masked object or that omits only the masked object.

FIG. 4 shows a third example of the use of the computing system 102 in which an encoder-type machine-trained model (not shown) has produced an embedding 402 and a supplemental item 404 based on an input data item (not shown). A decoder-type machine-trained model 406 uses both the embedding 402 and the supplemental item 404 to produce a data item 408 having a particular data type. More specifically, the embedding 402, as before, expresses the semantic content of the input data item. The encoder-type machine-trained model primes its algorithm with a randomly selected supplemental item 404. For instance, in some cases, the supplemental item 404 is a randomly-generated instance of noise information. The combination of the embedding 402 and the supplemental item 404 uniquely determines the content of the data item 408 that will be produced by the decoder-type machine-trained model 406.

For instance, consider the case in which the embedding 402 describes a dog of the husky breed. There is nevertheless many degrees of freedom that will control the appearance of the dog when rendered as an image, or the description of the dog when rendered as a text item. The randomly-chosen supplemental item 408 determines these attributes. For example, for a first supplemental item, the decoder-type machine-trained model 406 produces an image of a black and white husky dog walking on a sidewalk. For a second supplemental item, the decoder-type machine-trained model 406 produces an image of a brown and white husky dog in a snowy landscape.

FIG. 4 is illustrative of a more general point: any encoder-type machine-trained model, depending on its architecture and algorithmic composition, may provide one or more supplemental items, where a supplemental item is any item that has a bearing on how an output data item is rendered, in addition to the embedding 402. A randomly-selected instance of noise information is just one such supplemental item that may play a role in the rendering of an output data item. In specific application contexts, a supplemental item may be variously referred to as a seed, key, prompt, etc. The clipboard-managing comment 138 is configurable to store any of these supplemental items.

Figure 5:
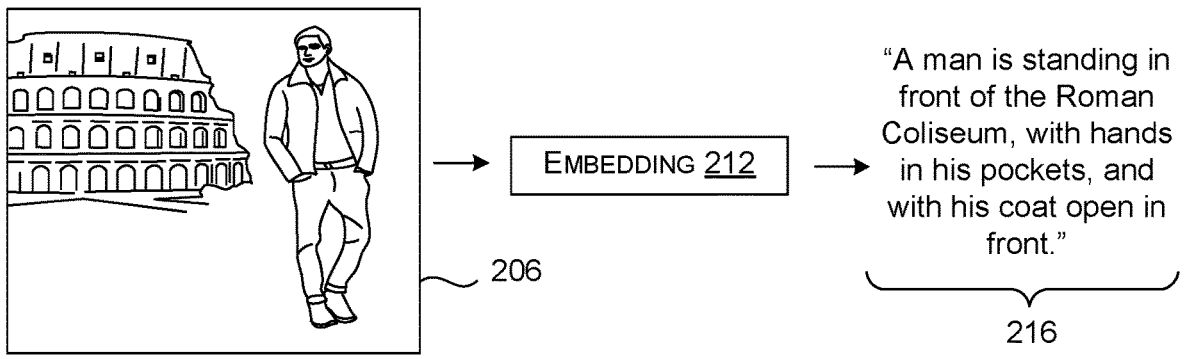
FIG. 5 depicts a conversion operation performed by the first example of FIG. 2.

FIG. 5 shows the kind of conversion produced by the first example of FIG. 2. Here, the image 206 shows a man with his hands in his pocket walking in front of the Roman Coliseum in Rome, Italy. The encoder-type machine-trained model 210 converts this image 206 into the embedding 212, and the decoder-type machine-trained model 210 converts the embedding 212 into the text item 216, which provides a textual description of what is happening in the image 206.

Figure 6:
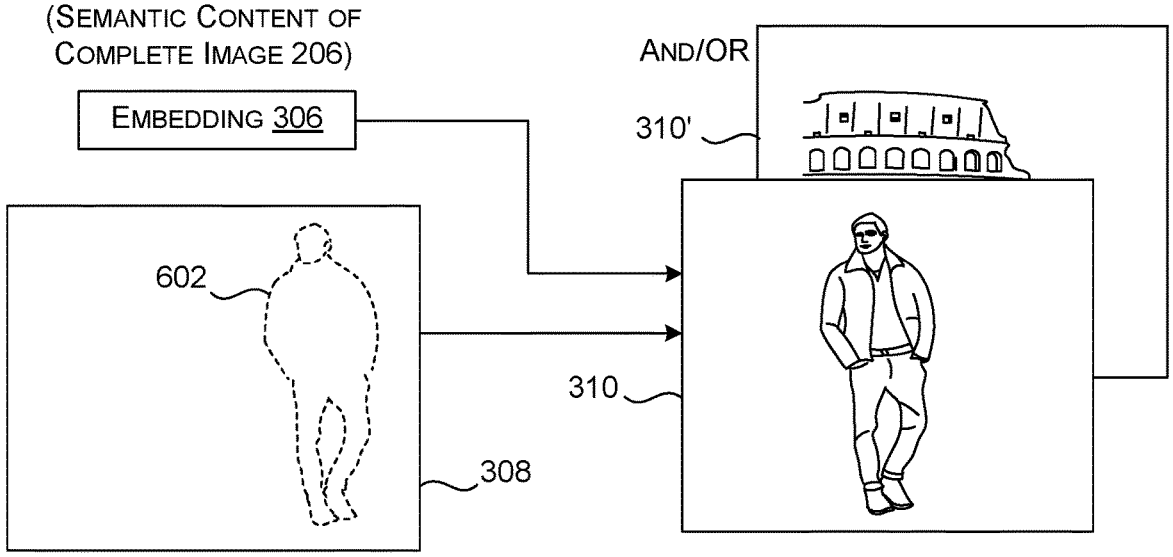
FIG. 6 depicts a conversion operation performed by the second example of FIG. 3.

FIG. 6 shows the kind of conversion produced by the second example of FIG. 3. Assume that an embedding 306 is the same as the embedding 212 of FIG. 4; it represents the full semantic content of the image 206. Assume that a mask-generating component (not shown) has previously produced the mask 306 by operating on the image 206. Further assume that the mask-generating component identifies the portion of the image 206 that corresponds to a human, and produces the mask 306 which demarcates the contours 602 of the human shape in the image 206. In other cases, the mask-generating component designates an object of interest using a region of interest (e.g., a rectangular region of interest). The decoder-type machine-trained model 304 is trained to produce the image 310 that contains just the man. Alternatively, or in addition, the decoder-type machine-trained model 304 is trained to produce an image 310' that shows the content in the original image 206, excluding the man. Different object-detecting components produce masks in different ways, such as using different algorithmic segmentation algorithms, using different machine-trained object-detection models, using an application that enables a user to manually select content to be masked, and so on. One example of a machine-trained object-detection model is REDMON, et al., "You Only Look Once: Unified, Real-Time Object Detection," arXiv, Cornell University arXiv: 1506.02640v5 [cs. CV], May 9, 2016, 10 pages.

The example of FIG. 3 is applicable to other types of syntheses. For example, another decoder-type machine-trained model (not shown) maps two or more embeddings that represent different semantic content into a single output data item. For example, assume that a first embedding represents a first object and a second embedding represents a second object. A decoder-type machine-trained model is trainable to map these two embeddings into an image that shows both of the objects, or a text item that describes both objects, etc. A training set establishes, in each of its training examples, how objects expressed in two or more input images are appropriately composed in a composite output image.

Figure 7:
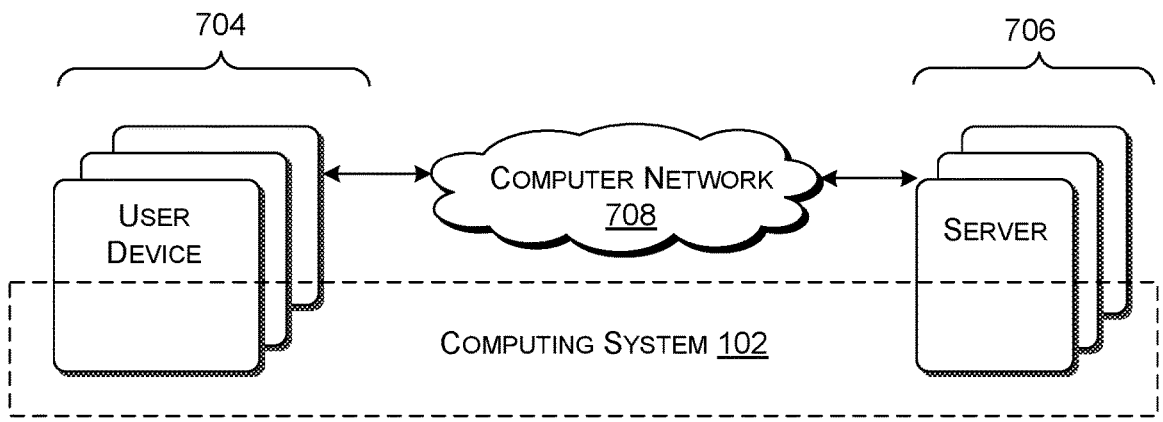
FIG. 7 shows illustrative computing equipment that is capable of implementing the computing system of FIG. 1.

FIG. 7 shows an example of computing equipment 702 that is capable of implementing the computing system 102 of FIG. 1. The computing equipment 702 includes a set of user devices 704 coupled to a set of servers 706 via a computer network 708. Each user device corresponds to any type of computing device, including any of a desktop computing device, a laptop computing device, a handheld computing device of any type (e.g., a smartphone or a tablet-type computing device), a mixed reality device, a wearable computing device, an Internet-of-Things (IOT) device, a gaming system, a media device, a vehicle-borne computing system, any type of robot computing system, a computing system in a manufacturing system, etc. In some implementations, the computer network 708 is implemented as a local area network, a wide area network (e.g., the Internet), one or more point-to-point links, or any combination thereof.

The dashed-line box in FIG. 7 indicates that the functionality of the computing system 102 is capable of being spread across the user devices 704 and/or the servers 706 in any manner. For instance, in some cases, each user device implements a local version of the computing system 102. Here, the servers 706 do not play any role in the operation of the computing system 102. In other implementations, one or more of the servers 706 implement the entirety of the computing system 102. Here, each user device interacts with the computing system 102 using a browser application, for instance. In other cases, the functionality associated with the computing system 102 is distributed between the servers 706 and each user device in any manner. For instance, in one such implementation, the servers 706 implement the set of machine-trained models and the model version-managing component 144, and each local user device implements the remainder of an instance of the computing system 102.

Figures 8, 9:
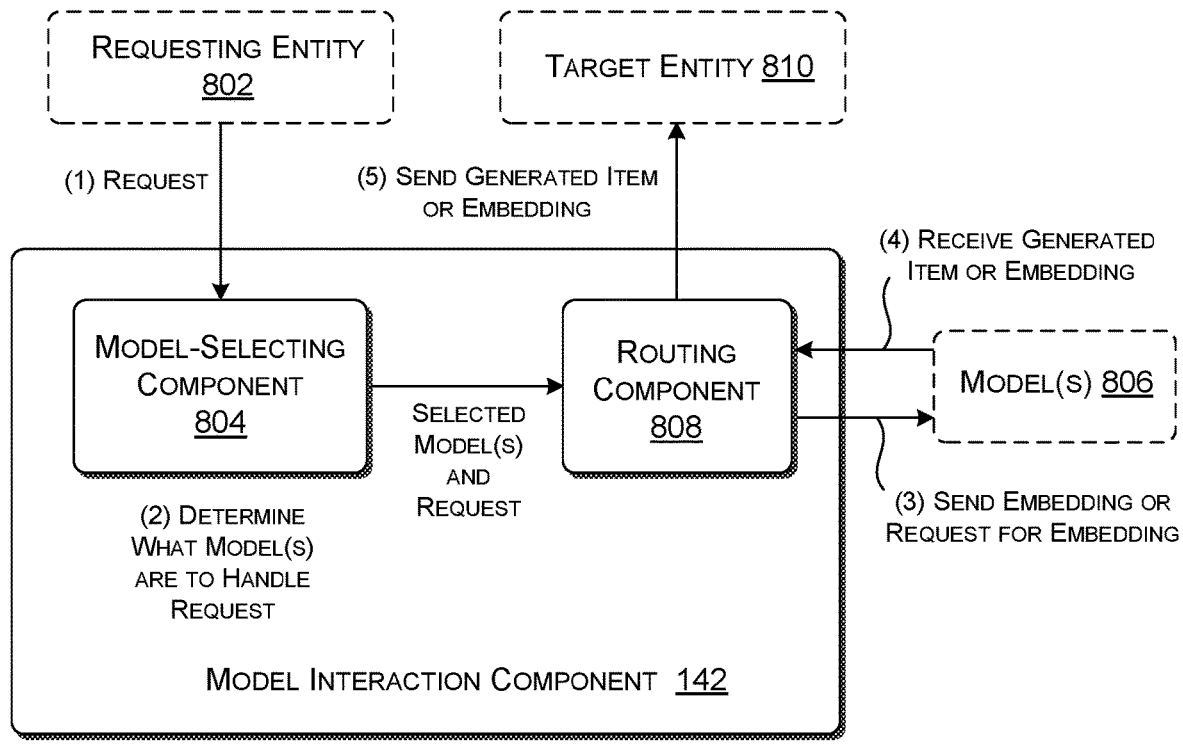
FIG. 8 shows one implementation of a model interaction component, which is one part of the computing system of FIG. 1.
FIG. 9 shows different processing scenarios that the model interaction component of FIG. 8 is capable of handling.

FIG. 8 shows one implementation of the model interaction component 142 of FIG. 1, which handles the selection and invocation of machine-trained models depending on the function that a user wishes to perform. Assume that a requesting entity 802 of any type requests the control system 104 to perform a particular function. A model-selecting component 804 determines which machine-trained model(s) 806 should be invoked to handle the request. A routing component 808 invokes the selected machine-trained model(s) 806 and sends the appropriate input data item(s) to the selected machine-trained model(s) 806. In some cases, the input data items include any of an image, a text item, etc. In other cases, the input data items include an embedding. The routing component 808 also forwards the result of the processing performed by the machine-trained model(s) 806 to a target entity 810. The result, for example, corresponds to an embedding or an output data item.

FIG. 9 shows examples of different scenarios that the model interaction component 142 is capable of handling. In a first scenario, an application (the requesting entity 802) requests the control system 104 to retrieve an embedding from the clipboard store 140, convert the embedding into an output data item, and map the output data item into an application workspace provided by the application. Here, the target entity 810 is the same as the requesting entity 802. In a second scenario, an application (the requesting entity 802) requests the control system 104 to map an input data item into an embedding and store the embedding in its clipboard store 140. Here, the target entity 810 is the clipboard-managing component 138. Still other scenarios are possible; the examples set forth above are merely illustrative.

Figure 10:
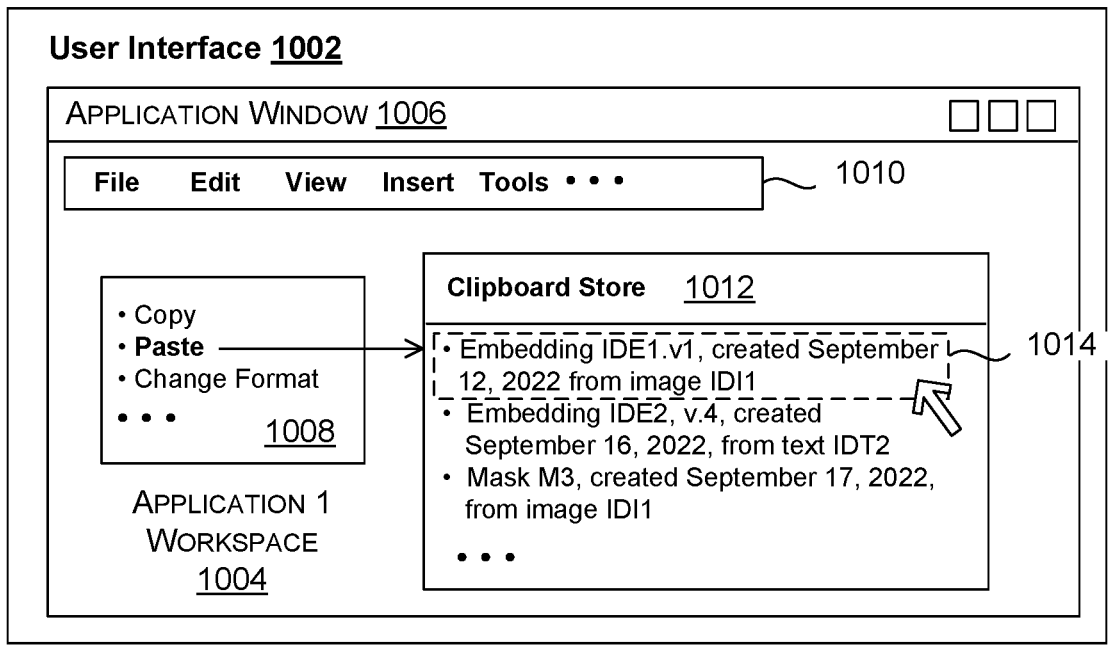
FIGS. 10-12 show illustrative details regarding the operation of a clipboard-managing component, which is another part of the computing system of FIG. 1, according to three respective implementations of the clipboard-managing component.

FIG. 10 shows a user interface presentation 1002 produced by the clipboard-managing component 138. Although not shown, the control system 104 presents the user interface presentation 1002 as part of a graphical user interface provided by a display device. In the specific example of FIG. 10, assume that the user is currently interacting with an application, and, in doing so, instructs the control system 104 to paste an output data item of a particular output data type into an application workspace 1004 provided by an application window 1006. For instance, assume that the application is a word processing program, and the user intends to paste a textual description extracted from a particular image into a text document that he or she is creating. Finally, assume that the control system 104 has previously stored plural embeddings that represent plural respective input data items in the clipboard store 140, including the particular image of interest to the user.

In some implementations, the control system 104 presents a menu 1008 of functions when the user clicks on an appropriate entry in a tool bar 1010 or right-clicks a mouse device in the application workspace 1004, or performs some other invocation operation. Assume that the user selects a paste function in this menu 1008. In response, the clipboard-managing component 138 presents a clipboard panel 1012 that shows the current contents of the clipboard store 140.

Different implementations of the clipboard-managing component 138 reveal the contents of the clipboard store 140 in different respective ways. In the merely illustrative case of FIG. 10, the clipboard-managing component 138 shows the following metadata items for each entry in the clipboard store 140, such an entry 1014: an identifier for the embedding ("IDE1"); a version of the embedding ("v1"); a date on which the embedding was created ("Sep. 12, 2022"); and an indication of a source data item from which the embedding originated ("image IDI1"). Upon the user's selection of the first entry 1014, the control system 104 functions in the manner described above to convert the embedding into a text item, and then paste the text item into the application workspace 1004. The clipboard store 140 efficiently represents output data items because a single embedding is convertible to plural output data items having different respective output data types.

Figure 11:
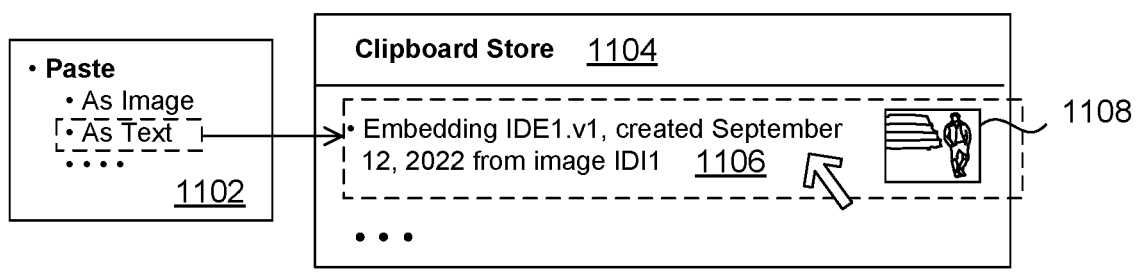

FIG. 11 shows a variation of the user interface experience of FIG. 10. In this case, a menu 1102 gives the user the option for pasting an embedding into an application workspace for different data types, such as a text data type or an image data type. In some examples, the control system 104 dynamically chooses the data type options based on the characteristics of the application workspace with which the user is interacting. For instance, the control system 104 will present options for only those data types that are applicable to the current application workspace. In other implementations, the control system 104 automatically chooses a default data type that matches the data type of the application workspace, e.g., by choose the text data type as the default data type when the user is creating a text document in the application workspace.

A clipboard panel 1104 includes an entry 1106 that includes the same metadata items as the entry 1014 of FIG. 1. In addition, the clipboard-managing component 138 presents a thumbnail image 1108 that provides a reduced-sized depiction of the original data item from which the entry's embedding originated. Here, the embedding originated from an image, so the thumbnail image 1108 shows a reduced-size and low resolution depiction of the original image. More specifically, the thumbnail image 1108 is said to be reduced size and low resolution relative to the size and resolution of the original image. Alternatively, the thumbnail image 1108 shows a reduced-sized version of whatever data item will be produced upon pasting the data item into the application workspace. For instance, if the user is in the process of pasting the embedding into the application workspace as a text item, the thumbnail image 1108 presents a visual depiction of the text item. The control system 104 produces the thumbnail image 1108 in different ways, such as by using an appropriate decoder-type machine-trained model to produce the thumbnail image 1108, or by producing a reduced-size version of the original data item if it is still available, etc.

Figure 12:
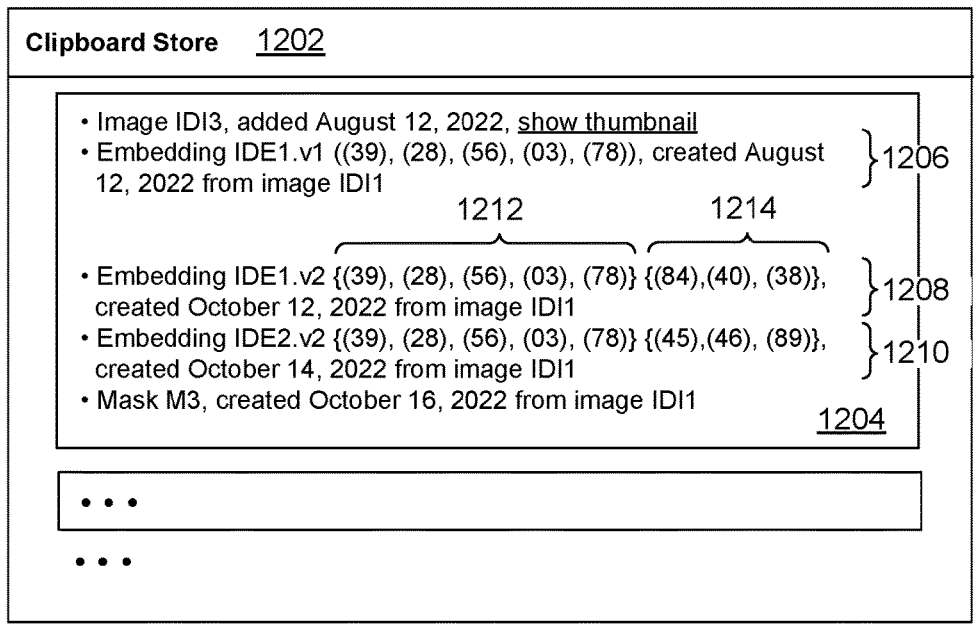

FIG. 12 shows another variation of the user interface experience of FIG. 10. Here, a clipboard panel 1202 presents one or more group entries, each of which includes one or more individual entries that pertain to an original data item. For example, a first group entry 1204 includes: an individual entry for the original data item, here corresponding to an image IDI3; an embedding 1206 produced from the image on a particular date using a first version ("v1") of an encoder-type machined model; an embedding 1208 produced from the image on another date using a second ("v2") (updated) version of the encoder-type machine-trained model; another embedding 1210 produced from the image on another date using the second (updated) version of the encoder-type machine-trained model; and a mask created on a specified date that demarcates a particular object in the original image. The embedding 1206 may be regarded as a predecessor embedding to the embedding 1208 (and also the embedding 1210). A predecessor embedding is generally any embedding that is prior to a later embedding, where both the predecessor embedding and the later embedding are produced by operating on the same data item, but with first and second versions of an encoder-type machine-trained model (the second version being a later version than the first version). Generally, the grouping of individual entries shown in FIG. 12 assists the user in understanding what is represented by the individual entries.

The embedding 1208 produced by the updated version ("v2") of the machine-trained model in an example of an embedding that includes two parts: a base part 1212 and a supplemental part. 1214. The base part 1212 describes semantic content in the image using a first level of detail. The supplemental part 1214 describes additional detail regarding the image, relative to the first level of detail. The supplemental part 1214 corresponds to a particular supplemental item, such as an instance of randomly-generated noise information. As in the previously discussed example, for instance, the base part 1212 broadly describes a husky dog. The supplemental part 1214 provides additional details that define other visual attributes of the husky dog and/or the background of the image in which the dog appears.

Note that the embedding 1210 is produced using the same version ("v2") of the encoder-type machine-trained model 1208, and that both embeddings (1208, 1210) have the same base part, but the supplemental part of the embedding 1210 is different than the supplemental part 1214 of the embedding 1208. Although not shown, the clipboard-managing component 138 is also configurable to store supplemental items as separate entries in the clipboard store 140. In this case, when invoking a decoder-type machine-trained model, a user is free to separately select a base part and a particular supplemental item.

Assume that the user clicks on the embedding produced by the updated version. But assume that the control system 104 includes a decoder-type machine-trained model that is only able to interpret the base part 1206 of the embedding. The decoder-type machine-trained model will nevertheless proceed by generating and presenting an output data item based on the base part 1206. Next assume that the control system 104 includes an updated decoder-type machine-trained model that is able to interpret both the base part 1206 and the supplemental part 1208. The decoder-type machine-trained model will generate and present an output data item based on both parts.

In some examples, a user chooses an embedding in combination with a supplemental item. A chosen decoder-type machine-trained model deterministically generates an output data item based on these two data items. If the user fails to choose a supplemental item, the decoder-type machine-trained model automatically generates a supplemental item. In this case, the output data item generated based on a selected embedding will vary from rendering to rendering, even though each rendering uses the same base part. In other cases, the decoder-type machine-trained model is not configured to perform its processing based on a supplemental item, in which case the user's selection of a supplemental item will be ignored by the decoder-type machine-trained model.

Figure 13:
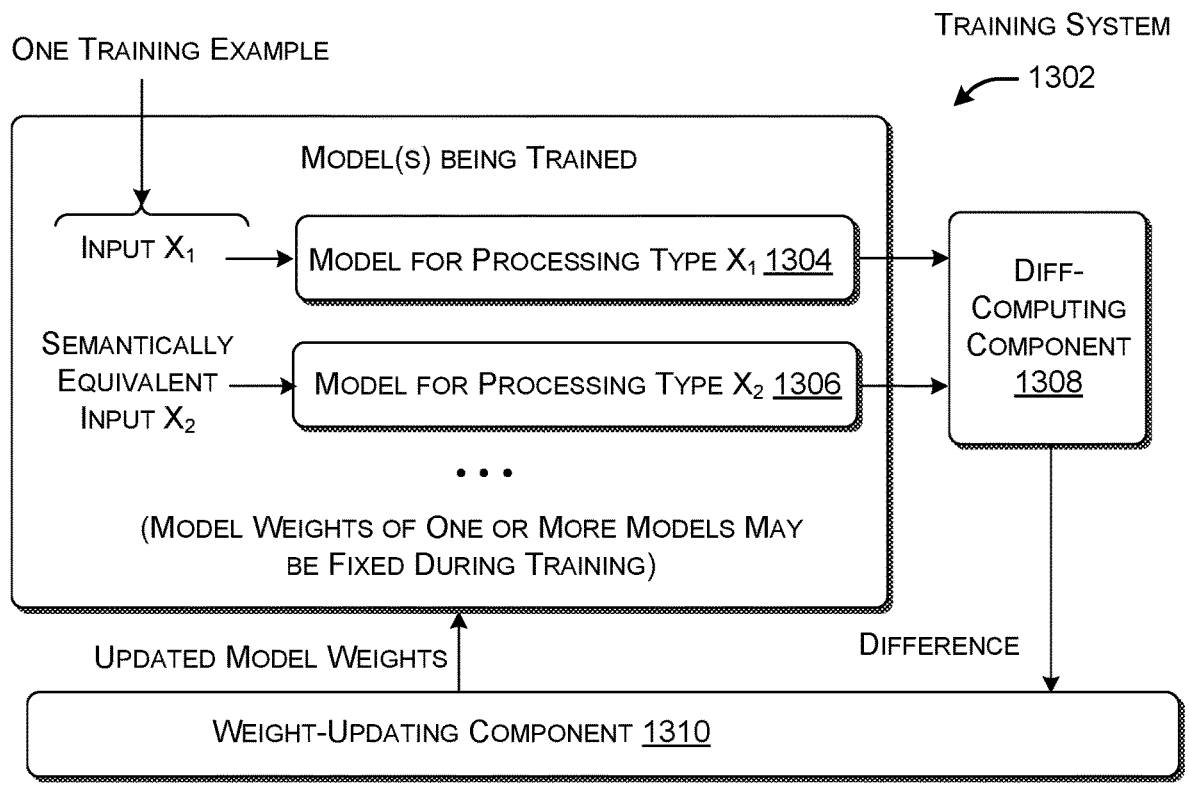
FIG. 13 shows a training system for training machine-trained models used in the computing system of FIG. 1.

FIG. 13 shows a training system 1302 for training the machine-trained models used in the control system 104 of FIG. 1. Consider an example in which the control system 104 initially includes no machine-trained models. In some implementations, the training system 1302 first trains an initial encoder-type machine-trained model X1 1304. The training system 1302 then trains each subsequent encoder-type machine-trained model (e.g., model X2 1306) such that it correctly maps items to the same vector space as the initial machine-trained model X1 1304, wherein the weights and biases of the machine-trained model X1 are considered fixed during the training of the machine-trained model X2. The training system 1302 trains each decoder model such that it correctly maps vectors in the established vector space to corresponding data items.

First consider one way in which the training system 1302 trains the initial machine-trained model X1 1304. In some implementations, the training system 1302 provides a set of training examples (not shown), each of includes a pair of data items together with a label that identifies an extent to which the data items express similar semantic content. The training system 1302 uses any type of machine-trained model, such as a deep neural network of any type, to map the data items in each training example into a pair of embedding vectors. For each training example, the training system 1302 determines a similarity measure that expresses how close the vectors are in vector space, e.g., using cosine similarity. The training system 1302 then computes a loss measure for the batch of training examples that collectively expresses an extent to which the vectors produced by the machine-trained model agree with the ground-truth labels in the training set. The training system 1302 uses the loss measure to update the weights and biases of the machine-trained model X1 1304, e.g., using stochastic gradient descent in combination with back projection.

In training a new encoder-type machine-trained model X2 1306, the training system 1302 performs training based on the principle that the machine-trained model X1 1304 and the machine-trained model X2 1306 should map two data items that express the same semantic content to approximately the same vectors in the established vector space, with the vector produced by the machine-trained model X1 1304 considered as fixed in the training of the machine-trained model X2 1306. A difference-computing component 1308 determines a similarity measure that expresses a degree of similarity between the two vectors, e.g., using cosine similarity. A weight-updating component 1310 determines a loss measure for a plurality of similarity measures computed for a batch of training examples, and updates the weights and biases of the machine-trained model X2 1306 on the basis of the loss measure. Likewise, in training a new decoder-type machine-trained model, the training system 1302 performs training based on the principle that two decoder-type machine-trained models should map two embeddings that represent the semantic content to respective data items that depict the same semantic content.

The model version-managing component 144 (of FIG. 1) performs a similar process to verify that any new encoder-type machine-trained model submitted by a developer correctly maps data items to vectors in the established vector space. Similarly, the model version-managing component 144 ensures that any new decoder-type machined-trained model correctly maps embeddings in the established vector space to data items. In some implementations, the model version-managing component 144 performs this function by using the new machine-trained model under consideration to process a test set of data items, and then comparing the results of the processing with ground-truth labels.

The remainder of this Section provides examples of model architectures that the computing system 102 can use to implement any of its machine-trained models. The model architectures are set forth here by way of illustration; it will be understood that the computing system 102 of FIG. 1 can use many other types of model architectures to build its models other than the specific example architectures set forth below.

Figure 14:
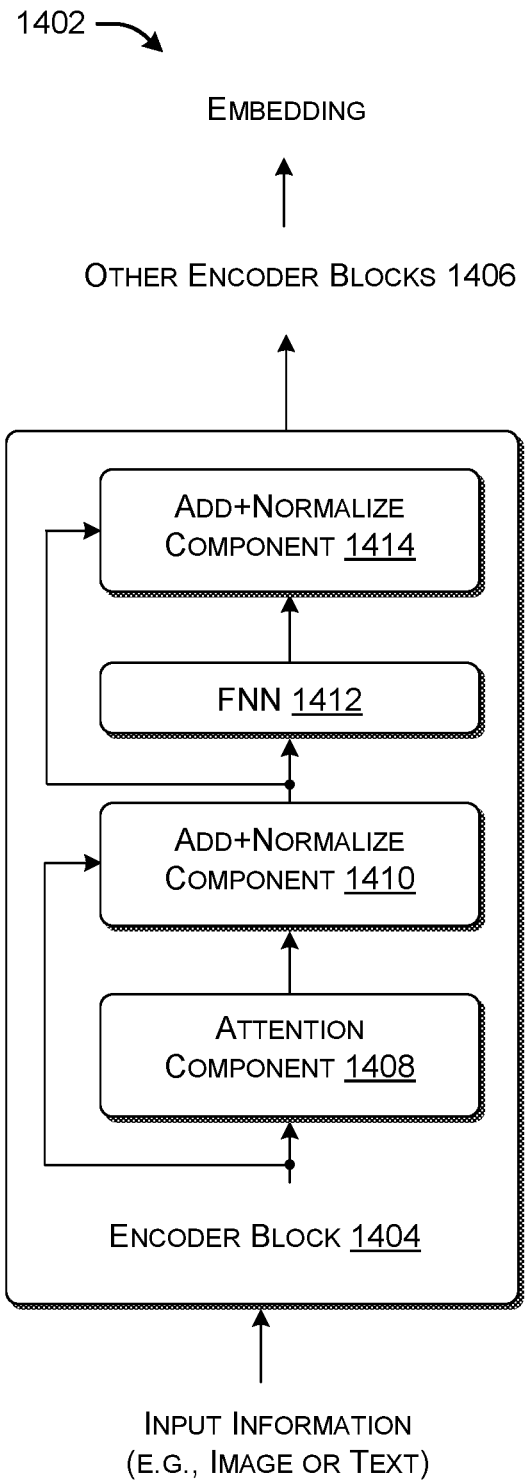
FIG. 14 shows a transformer-type machine-trained model for use in the computing system of FIG. 1.

Starting with FIG. 14, this figure shows a transformer-based machine-trained model 1402. In some examples, a developer uses this type of transformer-based machine-trained model 1402 to implement an encoder-type machine-trained model in the control system 104 of FIG. 1. The transformer-based machine-trained model 1402 provides a pipeline that includes plural encoder blocks (e.g., encoder blocks 1404, 1406). FIG. 14 shows a representative architecture of the first encoder block 1404. Although not shown, other encoder blocks share the same architecture as the first encoder block 1404. The first encoder block 1404 includes, in order, an attention component 1408, an add-and-normalize component 1410, a feed-forward neural network (FFN) 1412, and a second add-and-normalize component 1414. Assume that the first encoder block 1404 operates on a sequence of input vectors that describe feature information in a data item of any data type, including a text data type, an image data type, a video data type, an audio data type, etc.

The attention component 1408 performs self-attention analysis on the input information fed to the first encoder block 1404 using the following equation:

$$\text{Attention}(Q, K, V) = \text{Softmax}\left(\frac{QK^T}{\sqrt{d}}\right)V. \quad (1)$$

The attention component 1408 produces query information Q, key information K, and value information V shown in this equation by multiplying the input vectors fed to the attention component 1408 (which express the input feature information) by three respective machine-trained matrices, $W^Q$, $W^K$, and $W^V$. The attention component 1408 then takes the dot product of Q with the transpose of K, and divides the dot product by a scaling factor $\sqrt{d}$, to produce a scaled result. The symbol d represents the dimensionality of the transformer-based machine-trained model 1402. The attention component 1408 takes the Softmax (normalized exponential function) of the scaled result, and then multiples the result of the Softmax operation by V, to produce attention output information. More generally stated, the attention component 1408 determines the importance of each input vector under consideration with respect to every other input vector. Background information regarding the general concept of attention is provided in VASWANI, et al., "Attention Is All You Need," arXiv, Cornell University, arXiv: 1706.03762v5 [cs.CL], Dec. 6, 2017 15 pages.

The add-and-normalize component 1410 includes a residual connection that combines (e.g., sums) input information fed to the attention component 1408 with the output information generated by the attention component 1408. The add-and-normalize component 1410 then performs a layer normalization operation on the output information generated by of the residual connection, e.g., by normalizing values in the output information based on the mean and standard deviation of those values. The other add-and-normalize component 1414 performs the same functions as the first-mentioned add-and-normalize component 1410. The FFN 1412 transforms input information to output information using a feed-forward neural network having any number of layers and any activation function.

The transformer-based machine-trained model 1402 produces an output embedding that corresponds to output information produced by the last encoder blocks 1406. Alternatively, the transformer-based machine-trained model 1402 uses one or more additional neural network layers to process the output information produced by the last encoder blocks 1406. General background information regarding the use of transformer-based architectures to process text information is found in DEVLIN, et al., "BERT: Pre-training of Deep Bidirectional Transformers for Language Understanding," ArXiv, Cornell University, arXiv: 1810.04805v2 [cs.CL], May 24, 2019, 16 pages. General background information on the use of transformer-based architectures to process image information is provided in DOSOVITSKIY, et al., "An Image is Worth 16×16 Words: Transformers for Image Recognition at Scale," arXiv, Cornell University, arXiv:2010.11929v2 [cs.CV], Jun. 3, 2021, 22 pages. As described in Dosovitskiy, et al., one way of extracting feature information from an image, in preparation of submitting the feature information to a transformer-based encoder, is by partitioning the image into plural image patches, and extracting features associated with the image patches.

Figure 15:
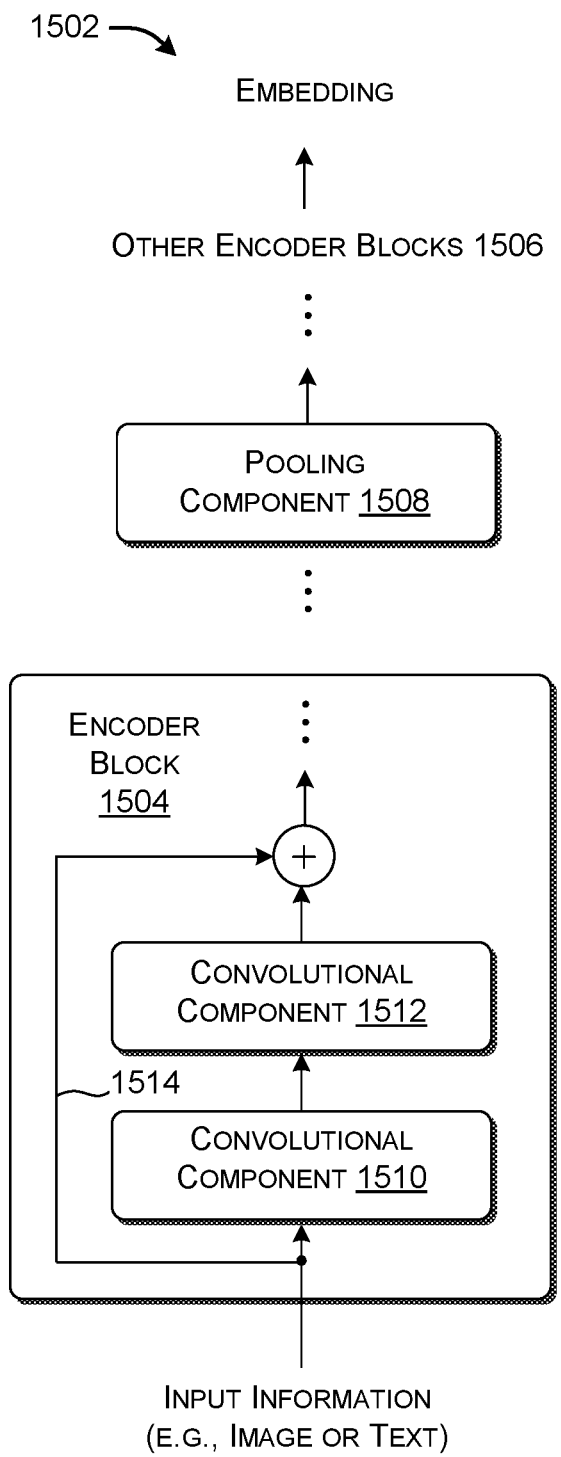
FIG. 15 shows a convolutional neural network (CNN) model for use in the computing system of FIG. 1.

FIG. 15 shows an illustrative convolutional neural network (CNN) model 1502. In some examples, a developer uses this type of CNN model 1502 to implement any type of encoder-type machine-trained model in the control system 104 of FIG. 1. Assume that the CNN model 1502 operates on feature information that describes features in a data item having any data type, including a text item, an image item, an audio item, etc., or a combination thereof.

The model CNN 1502 itself provides a pipeline that includes plural encoder blocks, such as encoder blocks (1504, 1506) optionally interspersed with pooling components, such as representative pooling component 1508. FIG. 15 specifically shows the merely illustrative case in which the representative encoder block 1504 includes a pair of convolutional components (1510, 1512). FIG. 15 also shows an optional residual connection 1514 that adds input information fed to the first convolutional component 1510 to output information produced by the second convolutional component 1512.

Each convolutional component performs a convolution operation that involves moving a machine-trainable n×m kernel (e.g., a 3×3 kernel) across feature information supplied to the convolutional component. In the case of an input image, the feature information represents image information. In the case of an input text item, the feature information represents text information. At each position of the kernel, the encoding subcomponent generates the dot product of the kernel values with the underlying values of the feature information. Each pooling component down-samples results of a preceding convolutional operation using some kind of sampling function, such as a maximum operation that selects a maximum value within a subset of values.

The CNN model 1502 produces an output embedding that corresponds to output information produced by the last encoder blocks 1506. Alternatively, the CNN model 1502 uses one or more additional neural network layers to process the output information produced by the last encoder blocks 1506, which serves as an output embedding. Background information on the general topic of convolutional neural networks is set forth in H E, et al., "Deep Residual Learning for Image Recognition," arXiv, Cornell University, arXiv: 1512.03385v1 [cs.CV], Dec. 10, 2015, 12 pages.

Figure 16:
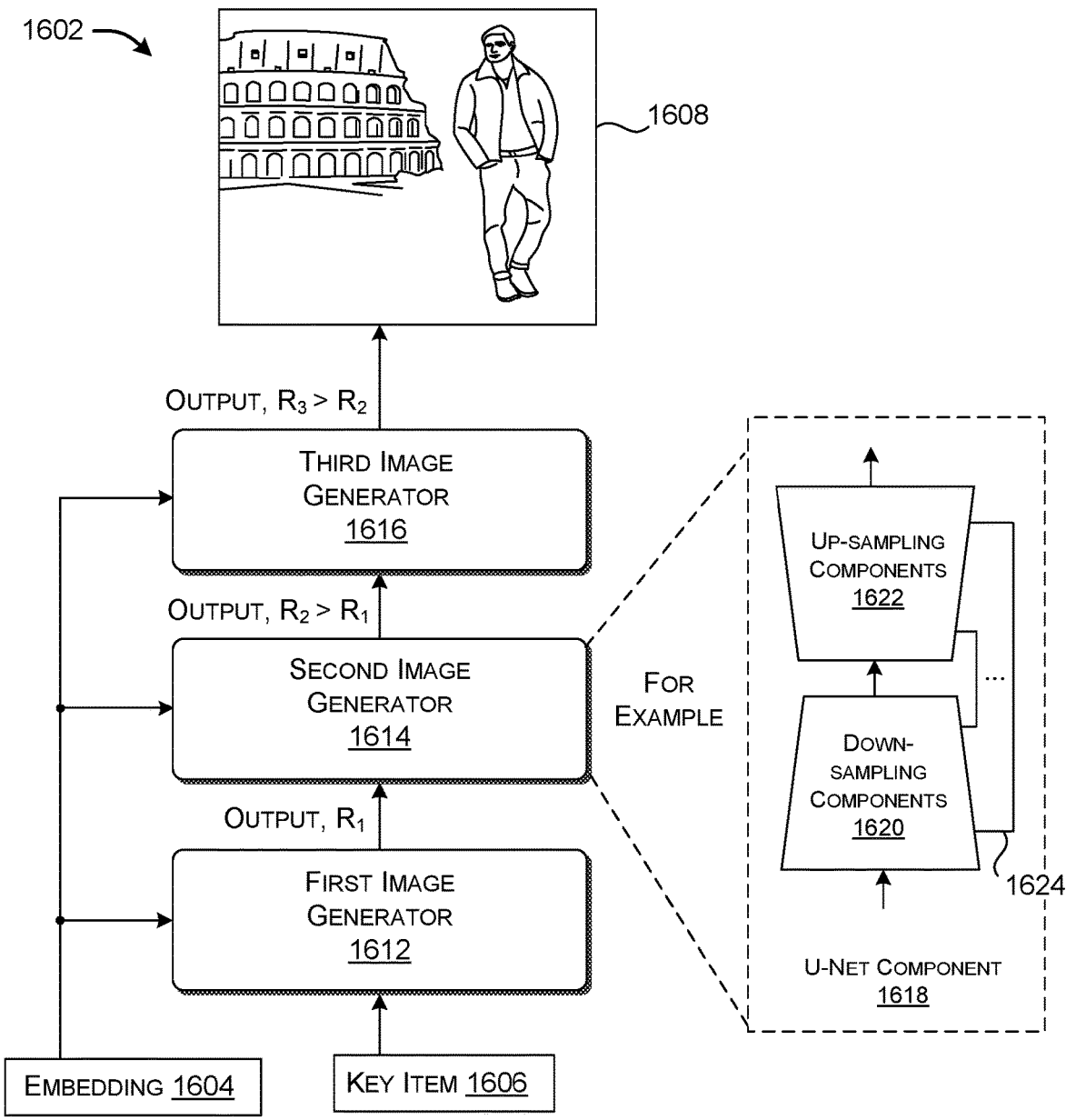
FIG. 16 shows a diffusion model for use in the computing system of FIG. 1.

FIG. 16 shows an example of a diffusion model 1602 that maps an embedding 1604 and a supplemental item 1606 to an image 1608. Assume that an encoder-type machine-trained model (not shown) has produced the embedding 1604 based on a text item 1610, as primed by a randomly-generated instance of noise information. The supplemental item 1606 corresponds to the randomly-generated instance of noise information.

In some implementations, the diffusion model 1602 successively transforms the supplemental item 1606 (which represents a sample of noise) into the image 1608, as guided by the embedding 1604, using a series of image generators (1612, 1614, 1616). The first image generator 1612 produces image information having a resolution of $R_1$. The second image generator 1614 produces image information having a resolution of $R_2$, where $R_2 > R_1$. The third image generator 1616 produces image information having a resolution of $R_3$, where $R_3 > R_2$, and so on. In some implementations, the diffusion model 1602 implements each image generator using a U-Net component. For instance, with respect to the presentative second image generator 1614, a U-Net component 1618 includes a series of down-sampling components 1620 followed by a series of up-sampling components 1622. Each down-sampling component or up-sampling component itself includes any combination of sub-components, including any of a convolutional component, a feed-forward component, a residual connection, an attention component, etc. Skip connections 1624 couple down-sampling and up-sampling components that perform processing with respect to the same resolution level. Background information on the general topic of diffusion models is provided in SAHARIA, et al., "Photorealistic Text-to-Image Diffusion Models with Deep Language Understanding," arXiv, Cornell University, arXiv:2205.11487v1 [cs.CV], May 23, 2022, 46 pages.

In other cases, a developer builds a decoder-type machine-trained model using the transformer architecture shown in FIG. 14. Background information on the use of the transformer-model architecture to recursively map an input data item to an output data item is provided in BROWN, et al., "Language Models are Few-Shot Learners," arXiv, Cornell University, arXiv:2005.14165v4 [cs.CL], Jul. 22, 2020, 75 pages. In other cases, a developer builds a decoder-type machine-trained model as a generative model produced using a generative adversarial network (GAN) training framework. Background information on one example of a GAN training framework for mapping a text item into an image is provided in X U, et al., "AttnGAN: Fine-Grained Text to Image Generation with Attentional Generative Adversarial Networks," arXiv, Cornell University, arXiv: 1711.10485v1 [cs.CV], Nov. 28, 2017, 9 pages. This reference provides another example of the use of an instance of randomly-generated noise information to prime a generative model.

B. Illustrative Processes

Figure 18:
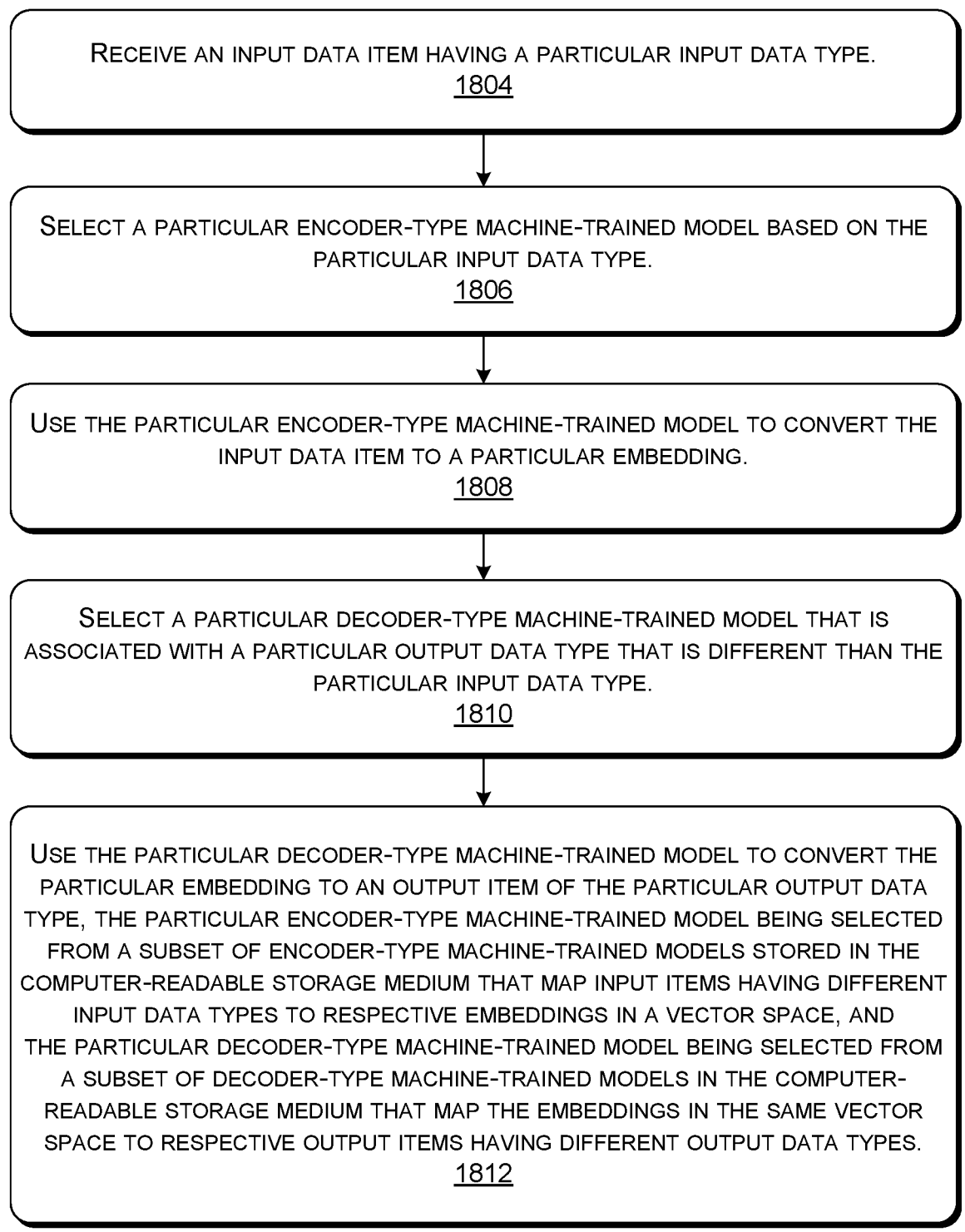
FIG. 18 shows a process that describes another manner of operation of the computing system of FIG. 1.

FIGS. 17 and 18 show processes that explain the operation of the computing system 102 of Section A in flowchart form. Since the principles underlying the operation of the computing system 102 have already been described in Section A, certain operations will be addressed in summary fashion in this section. Each of the flowcharts is expressed as a series of operations performed in a particular order. But the order of these operations is merely representative, and varies in other implementations. Further, any two or more operations described below is capable of being performed in a parallel manner. In one implementation, the blocks shown in the flowcharts that pertain to processing-related functions are implemented by the hardware logic circuitry described in Section C, which, in turn, includes one or more processors and/or other logic units that include a task-specific collection of logic gates.

More specifically, FIG. 17 shows a first computer-implemented process 1702 for performing a task. In block 1704, the computing system 102 selects a particular machine-trained model that has a data type associated with a requested task. The computing system 102 specifically chooses the particular machine-trained model from a set of machine-trained models, the set of machine-trained models including a subset (e.g., 116) of encoder-type machine-trained models that map input data items having different input data types to respective embeddings, and a subset (e.g., 130) of decoder-type machine-trained models that map the embeddings to respective output data items having different output data types. In block 1706, the computing system 102 executes the particular machine-trained model to perform at least part of the requested task.

FIG. 18 shows another computer-implemented process 1802 for performing a task. In block 1804, the computing system 102 receives an input data item having a particular input data type. In block 1806, the computing system 102 selects a particular encoder-type machine-trained model based on the particular input data type. In block 1808, the computing system 102 uses the particular encoder-type machine-trained model to convert the input data item to a particular embedding. In block 1810, the computing system 102 selects a particular decoder-type machine-trained model that is associated with a particular output data type that is different than the particular input data type. In block 1812, the computing system 102 uses the particular decoder-type machine-trained model to convert the particular embedding to an output data item of the particular output data type. More specifically, the computing system 102 chooses the particular encoder-type machine-trained model from a subset (e.g., 116) of stored encoder-type machine-trained models that map input data items having different input data types to respective embeddings in a vector space. The computing system 102 chooses the particular decoder-type machine-trained model from a subset (e.g., 130) of stored decoder-type machine-trained models that map the embeddings in the same vector space to respective output data items having different output data types.

C. Representative Computing Functionality

Figure 19:
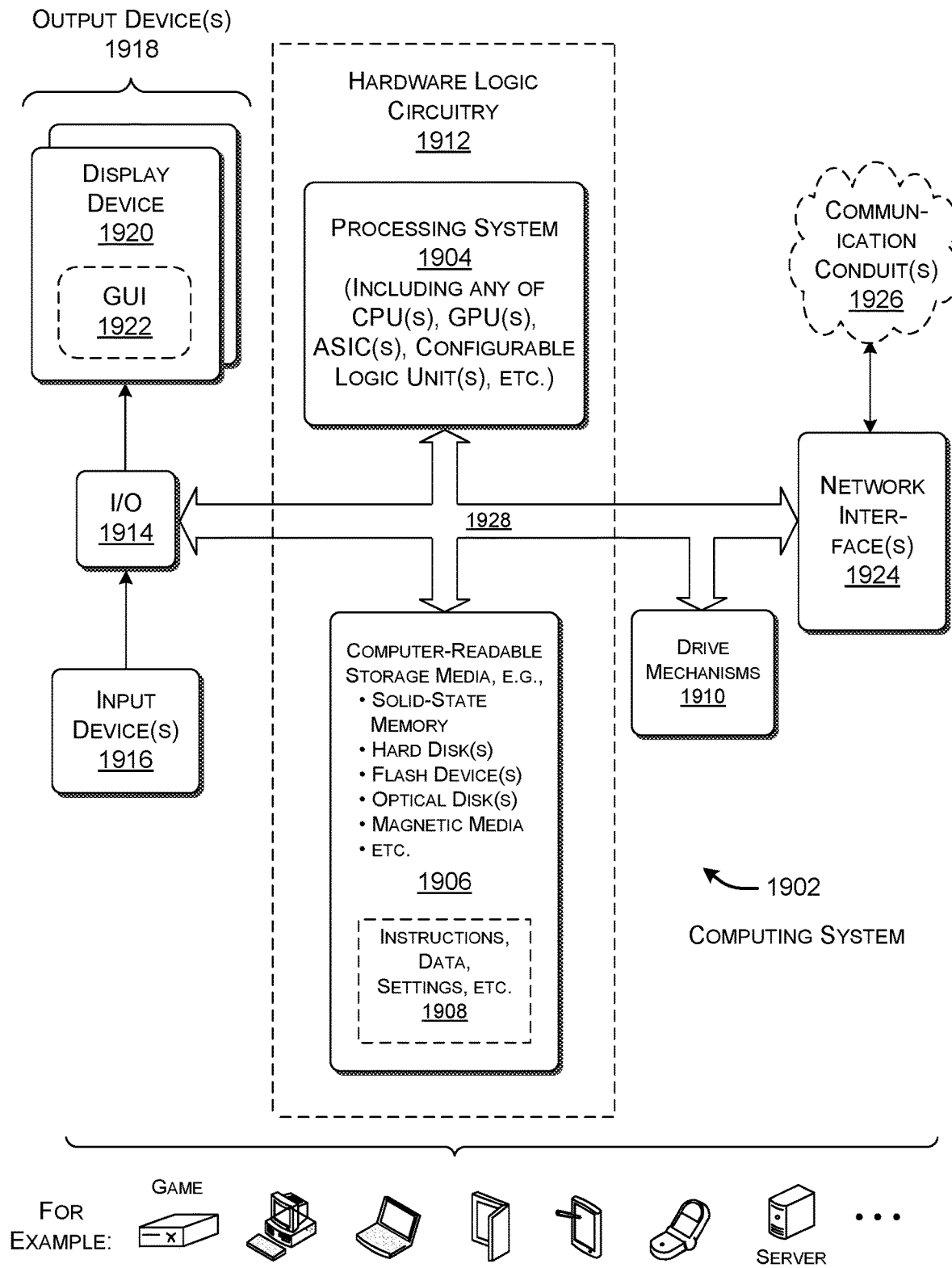
FIG. 19 shows an illustrative type of computing system that, in some implementations, is used to implement any aspect of the features shown in the foregoing drawings.

FIG. 19 shows a computing system 1902 that, in some implementations, is used to implement any aspect of the mechanisms set forth in the above-described figures. For instance, in some implementations, the type of computing system 1902 shown in FIG. 19 is used to implement any user computing device or any server shown in FIG. 7. In all cases, the computing system 1902 represents a physical and tangible processing mechanism.

The computing system 1902 includes a processing system 1904 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1902 also includes computer-readable storage media 1906, corresponding to one or more computer-readable media hardware units. The computer-readable storage media 1906 retains any kind of information 1908, such as machine-readable instructions, settings, and/or data. For example, in some implementations, the computer-readable storage media 1906 includes one or more solid-state devices, one or more magnetic hard disks, one or more optical disks, magnetic tape, etc. Any instance of the computer-readable storage media 1906 uses any technology for storing and retrieving information. Further, any instance of the computer-readable storage media 1906 represents a fixed or removable unit of the computing system 1902. Further, any instance of the computer-readable storage media 1906 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media.

The computing system 1902 utilizes any instance of the computer-readable storage media 1906 in different ways. For example, in some implementations, any instance of the computer-readable storage media 1906 represents a hardware memory unit (such as Random Access Memory (RAM)) for storing information during execution of a program by the computing system 1902, and/or a hardware storage unit (such as a hard disk) for retaining/archiving information on a more permanent basis. In the latter case, the computing system 1902 also includes one or more drive mechanisms 1910 (such as a hard drive mechanism) for storing and retrieving information from an instance of the computer-readable storage media 1906.

In some implementations, the computing system 1902 performs any of the functions described above when the processing system 1904 executes computer-readable instructions stored in any instance of the computer-readable storage media 1906. For instance, in some implementations, the computing system 1902 carries out computer-readable instructions to perform each block of the processes described in Section B. FIG. 19 generally indicates that hardware logic circuitry 1912 includes any combination of the processing system 1904 and the computer-readable storage media 1906.

In addition, or alternatively, the processing system 1904 includes one or more other configurable logic units that perform operations using a collection of logic gates. For instance, in some implementations, the processing system 1904 includes a fixed configuration of hardware logic gates, e.g., that are created and set at the time of manufacture, and thereafter unalterable. In addition, or alternatively, the processing system 1904 includes a collection of programmable hardware logic gates that are set to perform different application-specific tasks. The latter category of devices includes, including Programmable Array Logic Devices (PALs), Generic Array Logic Devices (GALs), Complex Programmable Logic Devices (CPLDs), Field-Programmable Gate Arrays (FPGAs), etc. In these implementations, the processing system 1904 effectively incorporates a storage device that stores computer-readable instructions, insofar as the configurable logic units are configured to execute the instructions and therefore embody or store these instructions.

In some cases (e.g., in the case in which the computing system 1902 represents a user computing device), the computing system 1902 also includes an input/output interface 1914 for receiving various inputs (via input devices 1916), and for providing various outputs (via output devices 1918). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1920 and an associated graphical user interface presentation (GUI) 1922. The display device 1920 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1902 also includes one or more network interfaces 1924 for exchanging data with other devices via one or more communication conduits 1926. One or more communication buses 1928 communicatively couple the above-described units together.

The communication conduit(s) 1926 is capable of being be implemented in any manner, e.g., by a local area computer network, a wide area computer network (e.g., the Internet), point-to-point connections, or any combination thereof. The communication conduit(s) 1926 include any combination of hardwired links, wireless links, routers, gateway functionality, name servers, etc., governed by any protocol or combination of protocols.

FIG. 19 shows the computing system 1902 as being composed of a discrete collection of separate units. In some cases, the collection of units corresponds to discrete hardware units provided in a computing device chassis having any form factor. FIG. 19 shows illustrative form factors in its bottom portion. In other cases, the computing system 1902 includes a hardware logic unit that integrates the functions of two or more of the units shown in FIG. 1. For instance, in some implementations, the computing system 1902 includes a system on a chip (SoC or SOC), corresponding to an integrated circuit that combines the functions of two or more of the units shown in FIG. 19.

The following summary provides a set of illustrative examples of the technology set forth herein.

(A1) According to a first aspect, a method (e.g., 1702) is described for performing a task. The method includes: selecting (e.g., 1704) a particular machine-trained model that has a data type associated with a requested task; and executing (e.g., 1706) the particular machine-trained model to perform at least part of the requested task. The operation of selecting in block 1704 involves choosing the particular machine-trained model from a set of machine-trained models, the set of machine-trained models including a subset (e.g., 116) of encoder-type machine-trained models that map input data items having different input data types to respective embeddings, and a subset (e.g., 130) of decoder-type machine-trained models that map the embeddings to respective output data items having different output data types.

(A2) According to some implementations of the method of A1, the selecting and executing are performed, at least in part, by a control system of a computing system.

(A3) According to some implementations of the methods of A1 or A2, the embeddings output by the encoder-type machine-trained models and input by the decoder-type machine-trained models are distributed-representation vectors mapped to a single vector space, and wherein a distance between any two vectors in the vector space reflects an extent of similarity between the two vectors.

(A4) According to some implementations of the method of A3, the method further includes introducing another machine-trained model to the set of machine-trained models that has been trained to produce or consume embeddings from the single vector space.

(A5) According to some implementations of any of the methods of A1-A4, the particular machine-trained model is a member of the subset of encoder-type machine-trained models. The data type associated with the requested task is a particular input data type associated with a particular input data item. The executing includes using the particular machine-trained model to convert the particular input data item into a particular embedding. The method further includes storing the particular embedding in a clipboard store.

(A6) According to some implementations of the method of A5, the method further includes storing the particular input data item in the clipboard store in response to selection of the particular input data item in an application. The executing is performed in response to a request to convert the input data item to a particular output data item having a particular output data type that differs from the particular input data type.

(A7) According to some implementations of the method of A5, the executing is performed in response to selection of the particular input data item by an application, independent of, and prior to, a request to convert the input data item to a particular output data item.

(A8) According to some implementations of the method of A5, the method further includes: using the particular machine-trained model to generate a supplemental item that, when combined with the particular embedding and fed to a particular decoder-type machine-trained model, determines content of a particular output data item produced by the particular decoder-type machine-trained model; and storing the supplemental item in the clipboard store along with the particular embedding.

(A9) According to some implementations of the method of A8, the supplemental item is an instance of randomly-generated noise information.

(A10) According to some implementations of the method A5, the clipboard store also includes a predecessor embedding produced by an earlier version of the particular machine-trained model for the particular input data item, prior to generating the particular embedding.

(A11) According to some implementations of the method of A10, the particular embedding includes a base part that matches information in the predecessor embedding, and another part that includes information that is not present in the predecessor embedding.

(A12) According to some implementations of the method of A5, the method further includes generating output information for presentation in a user interface presentation that represents contents of the clipboard store. The output information includes an image that conveys semantic contents of the particular embedding, for presentation in the user interface presentation together with a representation of the particular embedding.

(A13) According to some implementations of any of the methods of A1-A4, the particular machine-trained model is a member of the subset of decoder-type machine-trained models. The data type associated with the requested task is a particular output data type associated with a particular output data item. The executing includes using the particular machine-trained model to convert a particular embedding stored in a clipboard store to the particular output data item having the particular output data type.

(A14) According to some implementations of any of the methods of A1-A4, a given machine-trained model in the subset of decoder-type machine-trained models operates on two or more input data items, the two or more input data items including a particular embedding that expresses semantic content of a particular input data item.

(A15) According to some implementations of the method of A14, another of the two or more input data items is an image mask that identifies a portion of the particular input data item.

(B1) According to a second aspect, another method (e.g., 1802) is described for performing a task. The method includes receiving (e.g., 1804) an input data item having a particular input data type; selecting (e.g., 1806) a particular encoder-type machine-trained model based on the particular input data type; using (e.g., 1808) the particular encoder-type machine-trained model to convert the input data item to a particular embedding; selecting (e.g., 1810) a particular decoder-type machine-trained model that is associated with a particular output data type that is different than the particular input data type; and using (e.g., 1812) the particular decoder-type machine-trained model to convert the particular embedding to an output data item of the particular output data type. The particular encoder-type machine-trained model is selected from a subset (e.g., 116) of encoder-type machine-trained models stored in a computer-readable storage medium (e.g., 1906) that map input data items having different input data types to respective embeddings in a vector space. The particular decoder-type machine-trained model is selected from a subset (e.g., 130) of decoder-type machine-trained models (e.g., 130) in the computer-readable storage medium that map the embeddings in the same vector space to respective output data items having different output data types.

(C1) According to a third aspect, a computer-readable storage medium (e.g., 1906) is described for storing computer-readable instructions (e.g., 1908) and other information data. The computer-readable storage medium includes a set of machine-trained models, the set of machine-trained models including a subset (e.g., 116) of encoder-type machine-trained models that map input data items having different input data types to respective embeddings, and a subset (e.g., 130) of decoder-type machine-trained models that map the embeddings to respective output data items having different output data types. The computer-readable storage medium also includes a clipboard store (e.g., 140) that stores the embeddings produced by the subset of encoder-type machine-trained models, and instructions, that when executed by a processing system (e.g., 1904), select and invoke one or more machine-trained models from the set to carry out a task specified by an application. Each machine-trained model that is selected has a particular data type that is associated with the task.

In yet another aspect, some implementations of the technology described herein include a computing system (e.g., the computing system 1902) that includes a processing system (e.g., the processing system 1904) having a processor. The computing system also includes a storage device (e.g., the computer-readable storage media 1906) for storing computer-readable instructions (e.g., information 1908) that, when executed by the processing system, perform any of the methods described herein (e.g., any of the methods of A1-A15 or B1).

In yet another aspect, some implementations of the technology described herein include a computer-readable storage medium (e.g., the computer-readable storage media 1906) for storing computer-readable instructions (e.g., the information 1908). A processing system (e.g., the processing system 1904) executes the computer-readable instructions to perform any of the operations described herein (e.g., the operation in any of the methods of A1-A15 or B1).

More generally stated, any of the individual elements and steps described herein combinable into any logically consistent permutation or subset. Further, any such combination is capable of being be manifested as a method, device, system, computer-readable storage medium, data structure, article of manufacture, graphical user interface presentation, etc. The technology is also expressible as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1912 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that are to be considered optional; generally, any feature is to be considered as optional, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. A "set" includes zero members, one member, or more than one member. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving an input data item having a particular input data type;
executing at least part of a task that includes an instruction of pasting the input data item into a target item having a particular output data type that is different than the input data type, comprising:
executing a particular encoder-type machine-trained model to convert the input data item having the particular input data type to a particular embedding, wherein the particular encoder-type machine-trained model is one of a subset of encoder-type machine-trained models that map input data items having different input data types to respective embeddings in a single shared vector space;

storing the particular embedding in a clipboard store;

executing a particular decoder-type machine-trained model that is associated with the particular output data type, to convert the particular embedding to an output data item of the particular output data type of the target item, wherein the particular decoder-type machine-trained model is one of a subset of decoder-type machine-trained models that map the embeddings in the same single shared vector space to respective output data items having different output data types; and pasting the output data item into the target item.

2. The method of claim 1, wherein the method is executed, at least in part, by a control system of a computing system.

3. The method of claim 2, wherein the control system also manages versions of the subset of encoder-type machine-trained models and the subset of decoder-type machine-trained models.

4. The method of claim 1, wherein the embeddings output by the encoder-type machine-trained models and input to the decoder-type machine-trained models are distributed-representation vectors mapped to the single shared vector space, and wherein a distance between any two vectors in the vector space reflects an extent of similarity between the two vectors.

5. The method of claim 4, wherein the encoder-type machine-trained models and the decoder-type machine-trained models have been trained to produce or consume embeddings in the single shared vector space.

6. The method of claim 1, wherein the clipboard store also includes a predecessor embedding produced by an earlier version of the particular encoder-type machine-trained model for the input data item, prior to generating the particular embedding.

7. The method of claim 6, wherein the particular embedding includes a base part that matches information in the predecessor embedding, and another part that includes information that is not present in the predecessor embedding.

8. The method of claim 1, wherein the method further includes generating output information for presentation in a user interface presentation that represents contents of the clipboard store, and wherein the output information includes an image that conveys semantic contents of the particular embedding, for presentation in the user interface presentation together with a representation of the particular embedding.

9. The method of claim 1, wherein a given decoder-type machine-trained model in the subset of decoder-type machine-trained models operates on two or more input data items, the two or more input data items including a particular embedding that expresses semantic content of a particular input data item.

10. The method of claim 9, wherein another of the two or more input data items is an image mask that identifies a portion of the particular input data item.

11. The method of claim 1, further comprising:

generating a supplemental item in addition to the particular embedding; and storing the supplemental item in the clipboard store along with the particular embedding.

12. The method of claim 11, wherein the supplemental item is an instance of randomly-generated noise information.

13. The method of claim 11, wherein the particular decoder-type machine-trained produces the output data item based on the particular embedding and the supplemental item.

14. The method of claim 1, wherein at least one of the decoder-type machine-trained models of the subset of decoder-type machine-trained models receives two or more input data items from the clipboard store, and maps the two more input data items into a single output data item.

15. The method of claim 1, further comprising storing the input data item in the clipboard store prior to producing the particular embedding.

16. The method of claim 1, wherein at least one entry in the clipboard store provides an identifier for an embedding and an indication of a source data item from which the embedding originated.

17. A computing system, comprising:

a processing system for executing machine-readable instructions; and a storage device for storing the machine-readable instructions, the storage device also storing a set of machine-trained models, the set of machine-trained models including a subset of encoder-type machine-trained models that map input data items having different input data types to respective embeddings in a single shared vector space, and a subset of decoder-type machine-trained models that map the embeddings in the single shared vector space to respective output data items having different output data types, wherein any of the subset of encoder-type machine-trained models is capable of producing an embedding that is consumable by any of the subset of subset of decoder-type machine-trained models, the processing system executing the machine-readable instructions for:

receiving an input data item having a particular input data type;

executing at least part of a task that includes an instruction of pasting the input data item into a target item having a particular output data type that is different than the input data type, comprising:

executing a particular encoder-type machine-trained model of the subset of decoder-type machine-trained models to convert the input data item having the particular input data type to a particular embedding;

storing the particular embedding in a clipboard store;

executing a particular decoder-type machine-trained model, of the subset of decoder-type machine-trained models, that is associated with the particular output data type, to convert the particular embedding to an output data item of the particular output data type of the target item; and pasting the output data item into the target item.

18. The computing system of claim 17, wherein the embeddings output by the encoder-type machine-trained models and input to the decoder-type machine-trained models are distributed-representation vectors mapped to the single shared vector space, and wherein a distance between any two vectors in the vector space reflects an extent of similarity between the two vectors.

19. A non-transitory computer-readable storage medium for storing computer-readable instructions, wherein a processing system executing the computer-readable instructions performs operations comprising:
- receiving an input data item having a particular input data type;
- executing at least part of a task that includes an instruction of pasting the input data item into a target item having a particular output data type that is different than the input data type, comprising:
- executing a particular encoder-type machine-trained model to convert the input data item having the particular input data type to a particular embedding,
- wherein the particular encoder-type machine-trained model is one of a subset of encoder-type machine-trained models stored in the computer-readable storage medium that map input data items having different input data types to respective embeddings in a single shared vector space;
- storing the particular embedding in a clipboard store;
- executing a particular decoder-type machine-trained model that is associated with the particular output data type, to convert the particular embedding to an output data item of the particular output data type of the target item,
- wherein the particular decoder-type machine-trained model is one of a subset of decoder-type machine-trained models stored in the computer-readable storage medium that map the embeddings in the same single shared vector space to respective output data items having different output data types; and
- pasting the output data item into the target item.

20. The non-transitory computer-readable storage medium of claim 19,
- wherein the clipboard store also includes a predecessor embedding produced by an earlier version of the particular encoder-type machine-trained model for the input data item, prior to generating the particular embedding, and
- wherein the particular embedding includes a base part that matches information in the predecessor embedding, and another part that includes information that is not present in the predecessor embedding.

* * * * *